United States Patent [19]

Futami et al.

[11] Patent Number: 5,463,299
[45] Date of Patent: Oct. 31, 1995

[54] CURRENT CONTROLLER FOR CONTROLLING A CURRENT FLOWING IN A LOAD USING A PWM INVERTER AND METHOD USED THEREBY

[75] Inventors: Motoo Futami, Hitachi; Tunehiro Endo, Hitachiota; Yasuo Notohara, Hitachi; Tooru Kitayama, Tochigi, all of Japan

[73] Assignee: Hitachi, Ltd., Tokyo, Japan

[21] Appl. No.: 119,482

[22] Filed: Sep. 13, 1993

Related U.S. Application Data

[63] Continuation of Ser. No. 533,752, Jun. 27, 1990, abandoned.

[30] Foreign Application Priority Data

Jun. 7, 1989 [JP] Japan ........................... 1-142958

[51] Int. Cl.⁶ ..................................... H02P 6/00
[52] U.S. Cl. ..................... 318/618; 318/603; 318/254; 318/138
[58] Field of Search ..................... 318/560–618, 318/599, 799–832

[56] References Cited

U.S. PATENT DOCUMENTS

| | | | |
|---|---|---|---|
| 3,953,714 | 4/1976 | Gabillard | 235/150.2 |
| 4,101,817 | 7/1978 | Maeda et al. | 318/603 |
| 4,445,087 | 4/1984 | Mehnert | 324/175 |
| 4,449,191 | 5/1984 | Mehnert | 364/559 |
| 4,460,928 | 7/1984 | Kishimoto | 360/4 |
| 4,575,667 | 3/1986 | Kurakake | 318/803 |
| 4,615,000 | 9/1986 | Fujii et al. | 318/811 X |
| 4,661,756 | 4/1987 | Murphy et al. | 318/138 X |
| 4,761,599 | 8/1988 | Yasunobu et al. | 318/740 |
| 4,763,060 | 8/1988 | Takahashi | 318/811 |
| 4,868,923 | 9/1989 | Yoshihiro | 360/71 |
| 4,879,502 | 11/1989 | Endo et al. | 318/808 X |
| 4,879,754 | 11/1989 | Tadashi et al. | 388/810 |
| 4,978,896 | 12/1990 | Shah | 318/254 |
| 5,057,759 | 10/1991 | Ueda et al. | 318/616 |
| 5,115,386 | 5/1992 | Shirahama et al. | 363/41 |
| 5,124,625 | 6/1992 | Wakabayashi | 318/603 |
| 5,222,198 | 6/1993 | Yamamoto et al. | 395/80 |

OTHER PUBLICATIONS

"Semiconductor Power Conversion Laboratory Papaer" issued Nov. 12, 1988.
Hitachi Review vol. 38 (1989) No. 4, "Low–Noise Inverter–Driven Torque–Controlled Room Air Conditioners".
Vol. 105, No. ½ Jan./Feb. 1985, Trans. IEE of Japan "Brushless Motor Without a Shaft–Mounted Position Sensor".

*Primary Examiner*—Paul Ip
*Attorney, Agent, or Firm*—Antonelli, Terry, Stout & Kraus

[57] ABSTRACT

A current controller has provided therein assumed response generating means and load model means so as to realize repetitive type control with no influence of control delay against a periodically repetitive current response. This current controller is applied to a 120-degree current flow type motor using a pulse width modulation inverter, so that the DC current control including the process of response to the rise of the current can be realized only by a microcomputer.

25 Claims, 14 Drawing Sheets

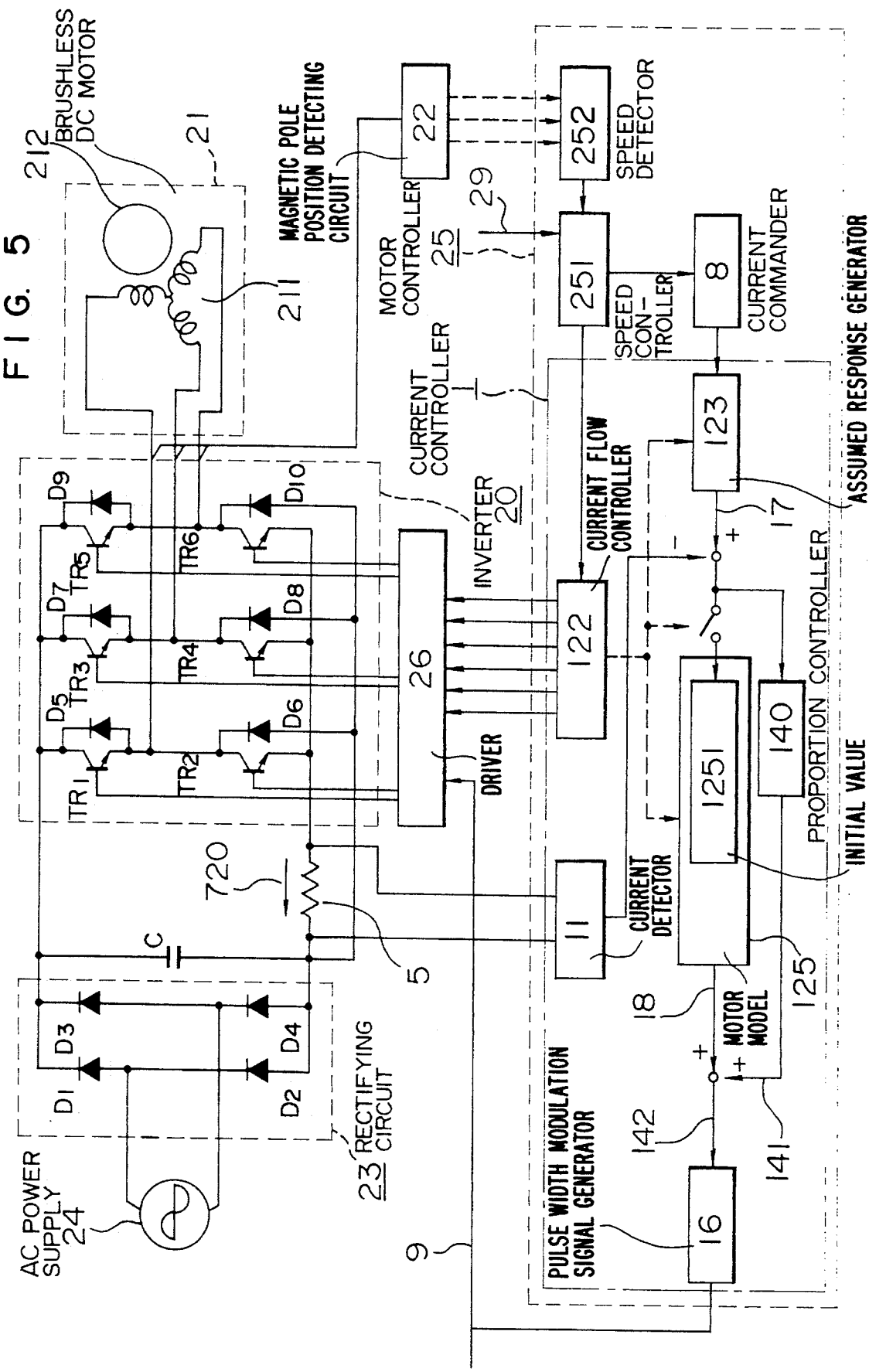

73 --- PULSE WIDTH MODULATED SIGNAL
74 --- SWITCHING PERIOD
75 --- PULSE WIDTH MODULATED SIGNAL PERIOD
76 --- MODIFIED INITIAL VALUE
77 --- GENERATION TABLE
78 --- OUTPUT TABLE

| 701B | 701A | 701B |
|------|------|------|
| 7051A | 7051B | 7051A |
| 7051B | 7051A | 7051B |

CURRENT CONTROLLER FOR CONTROLLING A CURRENT FLOWING IN A LOAD USING A PWM INVERTER AND METHOD USED THEREBY

This application is a continuation of application Ser. No. 553,752 filed on Jun. 7, 1990, now abandoned.

BACKGROUND OF THE INVENTION

This invention relates to a controller for controlling a current flowing in a motor by a pulse width modulation inverter, and particularly to a current controller for a motor which is suited to raise the current from zero to a target value in each of a plurality of successive constant time periods, to a method for such control, and to products to which the controller, the motor, and the method are applied.

In conventional current control of a motor, as disclosed in, for example, Japanese Patent laid-open Publication 39892/1986, a reference voltage and an applied voltage proportional to the current flowing in the motor are compared with each other by a comparator, and when the applied voltage exceeds the reference voltage, the current is stopped from flowing; thereafter, the current again flows in the motor after a constant time, that is, the current in the motor is interrupted periodically by an analog circuit using a comparator, resistors and capacitors.

The conventional current controller, which is formed of a comparator, resistors and capacitors, and is changed in its performance by temperature change and so on, needs adjustment and is very complicated in its construction because it consists of a plurality of elements. Moreover, when the conventional current controller is implemented in the form of a microcomputer, a problem of delay due to the conversion time and sampling time in the analog-digital convertor will reduce the quality of the performance or disable the control.

BACKGROUND OF THE INVENTION

One object of this invention is to provide a current controller for a motor and a control method therefor, wherein the current control is performed by use of a microcomputer so as to reduce the variation of the control performance of resistors, capacitors, a comparator and so on, the current control can be made to match other control, or speed control or position control for the motor by executing a small number of processes in the microcomputer, and there is no effect of delay due to sampling, analog-digital conversion and so on.

Another object of this invention is to provide a controller for a motor in which the current flowing during the pulse period of a pulse width modulation signal within a commutation period is made coincident with the rising state of current obtained from a current command value during each pulse period, and in order to achieve a stable control performance, a microcomputer is used, but the processing time therein is shortened so that the current control can be made to match other control, or the speed control or position control of the motor; also there is no influence of delay due to sampling, analog-digital conversion and so on.

Still another object of this invention is to provide a controller for a motor wherein the current control can be always satisfactorily performed irrespective of the state of the motor by modifying the variables included in the motor model means which is realized in the microcomputer so that it coincides with the actual motor.

Still a further object of this invention is to provide a calculator unit which enables current control by the microcomputer so as to obtain a short processing time and to not so frequently interrupt the execution of other control, or the speed control or position control of the motor.

A further object of this invention is to provide a compressor in which the vibration is always reduced irrespective of the state of the compressor by changing a command current relative to the rotational position of the compressor so that the drive torque of the motor is supplied to the compressor in accordance with the load torque of the compressor to thereby rotate it at a constant speed, and which is driven under a small controller since the current controller is realized by a microcomputer.

A still further object of this invention is to provide an air blower which can be always driven at a constant torque and with low vibration by changing the rise time of the current in accordance with the circulating current resulting from commutation in order to reduce the torque variation of the motor for driving the blower which variation is caused in association with the commutation.

In order to achieve the above objects, according to this invention, there is provided a current controller including modulating means for modulating a current within a first period during each second period by a pulse width modulation signal having a first period with which a constant load current response is repeated and in which a plurality of pulses are included, detection means for detecting a current in a load at least once within the second period, and means for producing the pulse width modulation signal in accordance with a current flow rate in order to make the detected current agree with a command value, characterized in that the current controller further comprises assumed response generating means for generating an assumed response as a current response within the first period in accordance with a command current, load model means for finding the current flow rate in accordance with an initial value stored in a readable and writable memory element in order to cause a current to flow corresponding to the assumed response, and means for modifying the initial value of the load model means in accordance with the difference between the detected current and the assumed response output and generating the necessary flow rate during the second period as time elapses after the start of the first period.

Moreover, according to this invention, there is provided a current controller for a motor including a pulse width modulation inverter for driving the motor, modulating means for modulating a commutation period by a pulse width modulation signal having a plurality of pulses within the commutation period in which the direction of a current to the motor is changed, detection means for detecting the current a plurality of times within the commutation period, and means for generating a pulse width modulation signal according to a current flow rate in order to make the detected current agree with a command current, characterized in that the current controller further comprises assumed response generating means for generating an assumed response as a current response within the commutation period in accordance with the command current, motor model means for finding the current flow rate in accordance with an initial value stored in a readable and writable memory element in order to cause a motor current to flow corresponding to the assumed response, and means for modifying the initial value of the motor model means in accordance with the difference between the detected current and the assumed response and generating the necessary flow rate as time elapses after the start of the commutation.

Moreover, according to this invention, there is provided a current controller for a motor including a pulse width modulation inverter for driving the motor, modulating means for modulating a commutation period by a pulse width modulation signal having a plurality of pulses within the commutation period in which the direction of current to the motor is changed, detection means for detecting the current a plurality of times within the commutation period, and means for generating the pulse width modulation signal according to a current flow rate in order to make the detected current agree with a command current, characterized in that the current controller further comprises assumed response generating means for generating an assumed response as a current response within the commutation period in accordance with the command current, numerical formula based motor model means for generating a control output associated with a motor current in accordance with the assumed response and the initial value stored in a readable and writable memory element, and modifying means for generating the current flow rate as the control output in accordance with the output of the motor model means which changes as time elapses after the commutation within the commutation period, and modifying after each end of the commutation period the initial value of the motor model means in accordance with the difference between a sequence of current detected values detected within the finished commutation period and a sequence of assumed responses at the time when the control output is produced within the finished commutation period.

Also, according to this invention, there is provided a current controller for motor including a motor, a pulse width modulation inverter for driving the motor, modulating means for modulating a commutation period by a pulse width modulation signal having a plurality of pulses within the commutation period in which the direction of current to the motor is changed, detection means for detecting the current a plurality of times within the commutation period, and means for generating the pulse width modulation signal according to a current flow rate in order to make the detected current agree with a command current, characterized in that the current controller further comprises assumed response generating means for generating an assumed response as a current response within the commutation period in accordance with the command current, motor model means for finding a current flow rate in accordance with the initial value stored in a readable and writable memory element in order to cause a motor current to flow corresponding to the assumed response; modifying means for modifying the current flow rate in accordance with the difference between the detected current and the assumed response; and modifying means for modifying the initial value of the motor model means in accordance with the difference between said detected current and the assumed response, generating the necessary current flow rate as time elapses after commutation in turn, and modifying the generated flow rate in accordance with the difference between the just previously detected current value and the value of the assumed response value associated with the detected value.

Also, according to this invention there is provided a current controller for motor including a motor, a pulse width modulation inverter for driving the motor, modulating means for modulating a commutation period by a pulse width modulation signal having a plurality of pulses within the commutation period in which the direction of current to the motor is changed, detection means for detecting the current a plurality of times within the commutation period, and means for generating the pulse width modulation signal according to a current flow rate in order to make the detected current agree with a command current, characterized in that the current controller further comprises assumed response generating means for generating an assumed response as a current response within the commutation period in accordance with the command current, motor model means for finding the current flow rate in accordance with the initial value stored in a readable and writable memory element and at least one coefficient relating to the amount of change of the current flow rate changing within the commutation period in order to cause a motor current to flow corresponding to the assumed response, and means for modifying the initial value of the motor model means in accordance with the difference between the detected current and the assumed response, modifying the parameter in accordance with the changed pattern within one commutation period of the detected current and the changed pattern within the commutation period of the assumed response, and sequentially generating the necessary flow rate as time elapses after the commutation.

Moreover, according to this invention, there is provided a current controller for motor including a motor, a pulse width modulation inverter for driving said motor, modulating means for modulating a current reverse period by a pulse width modulation signal having a plurality of pulses within the commutation period in which the direction of current to the motor is changed, detection means for detecting the current a plurality of times within the commutation period, and means for generating the pulse width modulation signal according to a current flow rate in order to make the detected current agree with a command current, characterized in that the current controller further comprises assumed response generating means for generating an assumed response as a current response within the commutation period in accordance with the command current, motor model means for generating the current flow rate necessary for causing a motor current to flow corresponding to the assumed response by calculating a parameter stored in at least one readable and writable memory element from the initial value stored in a readable and writable memory element, calculator means for calculating the initial value and the parameter, and means for modifying the initial value in accordance with the integrated value of the difference between the detected current and the assumed response, modifying the parameter on the basis of the current response state, and generating the flow rate in turn by calculating the initial value and the parameter as time elapses after the commutation.

Further, according to this invention, there is provided a current controller including calculator means having a first period in which control output is calculated, and a second period in which a plurality of control outputs are produced within the first period, and making calculation within the first period to determine a series of control outputs, output means for producing control output during the second period, and at least one readable and writable memory element having stored therein a parameter associated with the control output, characterized in that the controller comprises two pattern tables each formed of a plurality of readable and writable memory elements, and means for modifying the parameter associated with the control output of the n-th period in the first period before at least the (n-2)-th period, calculating control outputs produced at the second period in the n-th period, within the (n-1)-th period, storing the amounts of control in one of the two pattern tables, and producing control outputs associated with the (n-1)-th period from the other pattern table in which the control output are stored within the (n-2)-th period of the first period, at the second period.

Further, according to this invention, there is provided a current controller for a motor including a pulse width modulation inverter for driving the motor, modulating means for modulating a commutation period by a pulse width modulation signal having a plurality of pulses within the commutation period in which the direction of current to the motor is changed, detection means for detecting the current a plurality of times within the commutation period, and means for generating the pulse width modulated signal according to a current flow rate in order to make the detected current agree with a command current, assumed response generating means for generating an assumed response as a current response within the commutation period in accordance with the command current, and motor model means for finding the current flow rate in accordance with the initial value stored in a readable and writable memory element in order to cause a motor current to flow corresponding to the assumed response, characterized in that the current controller for the motor comprises two flow rate pattern tables each formed of a plurality of readable and writable memory elements and which store the current flow rates of the pulse width modulation signal within the commutation period in turn, and means having at least two initial values of the motor model means, and which modifies the initial values of the motor model means in the n-th commutation period in accordance with the difference between the detected current and the assumed response before at least the (n-2)-th commutation period, stores the output from the motor model means in accordance with the time lapse after the commutation due to the initial value within the (n-1)-th commutation period, in one of the two flow rate pattern tables, and producing the flow rates associated with the (n-1)-th commutation period from the other flow rate pattern table in which the flow rates are stored within the (n-2)-th commutation period at each output period of the pulse width modulation signal.

Further, according to this invention, there is provided a current controller for a motor including a pulse width modulation inverter for driving the motor, modulating means for modulating a commutation period by a pulse width modulation signal having a plurality of pulses within the commutation period in which the direction of current to the motor is changed, detection means for detecting the current a plurality of times within the commutation period, and means for generating the pulse width modulation signal according to a current flow rate in order to make the detected current agree with a command current, characterized in that the current controller for motor further comprises altering means for altering the on or off time of the pulse width modulation signal in asynchronism with the pulse width modulation signal period, and calculator means for permitting the on or off time of the pulse width modulation signal to agree with the commutation at each commutation at which the previous current switching period ends and the next current switching period starts, and determining the current flow rate in accordance with the difference between the command current and the detected current.

Further, according to this invention, there is provided a calculator unit including a calculator element, a counting element which increments or decrements in accordance with the change of an input signal, a readable and writable memory element for storing a numerical value, and determining means for determining either one of the two output states in accordance with the comparison between the contents of the counting element and the memory element, characterized in that the calculator unit further comprises a signal control element for generating an initializing signal in accordance with the change of a signal from the external or a signal from the calculator unit, and means for resetting the value of the counting element into an arbitrary value by the initializing signal.

Further, according to this invention, there is provided a compressor system including a compressor, a motor, a pulse width modulation inverter for driving the motor, modulating means for modulating a commutation period by a pulse width modulation signal having a plurality of pulses within the commutation period in which the direction of current to the motor is changed, detection means for detecting the current a plurality of times within the commutation period, and means for generating the pulse width modulation signal according to a current flow rate in order to make the detected current agree with a command current, characterized in that the compressor system further comprises assumed response generating means for motor which generates an assumed response as a current response within the commutation period in accordance with the command current, motor model means for finding the current flow rate in accordance with the initial value stored in a readable and writable memory element in order to cause a motor current to flow corresponding to the assumed response, and means for modifying the initial value of the motor model means in accordance with the difference between the detected current and the assumed response and sequentially generating the necessary flow rate as time elapses after the commutation.

Further, according to this invention, there is provided a motor system including a motor, a pulse width modulation inverter for driving the motor, modulation means for modulating the commutation period by a pulse width modulated signal having a plurality of pulses within the commutation period in which the current is changed in its direction, means for detecting the current a plurality of times within the commutation period, and means for generating a pulse width modulation output in accordance with the flow rate in order to make the detected current parameter with a command current, characterized in that the motor system comprises assumed response generating means for generating an assumed response as a current response within the commutation period in accordance with the command current, motor model means for finding a current flow rate in accordance with the initial value stored in a readable and writable memory element in order to flow a motor current corresponding to the assumed response, and means for modifying the initial value of the model means in accordance with the detected current and the assumed response, and sequentially generating the necessary flow rate as time elapses after the commutation.

Further, according to this invention, there is provided an air blower system including an air blower, a motor for driving the blower, a pulse width modulation inverter for driving this motor, modulating means for modulating a commutation period by a pulse width modulation signal having a plurality of pulses within the commutation period in which the direction of current to the motor is changed, detection means for detecting the current a plurality of times within the commutation period, and means for generating the pulse width modulated signal according to a current flow rate in order to make the detected current agree with a command current, characterized in that the air blower system further comprises assumed response generating means for motor which generates an assumed response as a current response within the commutation period in accordance with the command current, motor model means for finding the current flow rate in accordance with the initial value stored in a readable and writable memory element in order to flow a motor current corresponding to the assumed response, and means for modifying the initial value of the motor model means in accordance with the difference between the detected current and the assumed response and sequentially generating the necessary flow rate as time elapses after the commutation.

Further, according to this invention, there is provided a current control method for controlling a load current to be adjusted to substantially the same response, or to rise from zero current to an arbitrary current command value at each first period with which a constant load current response is repeated, comprising the steps of generating an assumed response for fixing the rise response to a specified form, sequentially generating a current flow rate as an input to a load on the basis of an initial value by using load model means comprising a time function having the initial value for the load current response coincident with this assumed response, detecting the load current once for each current flow rate, integrating the error between the current detected value and the assumed response associated with this detected current value, and at the end of each period repeatedly modifying the initial value stored in a readable and writable memory element of the load model means in accordance with the integrated value of the current error within this period, thereby to make the load current coincident with an arbitrary current command in average within the period.

Further, according to this invention, there is provided a current control method for controlling a load current to be adjusted to substantially the same response, or to rise from zero current to an arbitrary current command value at each first period with which a constant load current response is repeated, comprising the steps of generating an assumed response for fixing the rise response to a specified form, sequentially generating a current flow rate as an input to a load on the basis of an initial value and a parameter by using load model means which is a time function having the initial value for the load current response coincident with this assumed response, and which has at least one parameter for altering this function form, detecting the load current once for each current flow rate, integrating the error between the current detected value and the assumed response associated with this detected current value, and at the end of each period modifying the initial value stored in a readable and writable memory element of the load model means in accordance with the integrated value of the current error within this period, and repeatedly modifying the parameter by the error of a particular response in the response waveform, or the speed of rise or the like, thereby to make the average current within the commutation coincident with an arbitrary command value and to make the response form coincident with the assumed response.

Further, according to this invention, there is provided a current control method according to the above-given current control method, wherein the initial value and the parameter in the motor model means are determined at least two periods before the commutation period in which these initial value and parameter are used, two pattern tables capable of reading and writing are provided to sequentially store the current flow rates generated with the lapse of time, the result of computation in the motor model means is stored in one of the pattern tables in the period just before the commutation period in which the current flow rates are used, and the current flow rates previously stored in the other pattern table one commutation period before are read in turn, so that the generation of the current flow rates and the output thereof can be independently executed, that the time for the output thereof can be reduced, and that the current flow rates can be read and fed at a high speed.

Further, according to this invention, there is provided a current control method according to the above given current control method, wherein the number of the initial values and parameters provided in the motor model means corresponds to that of the commutation periods in one revolution of the motor, the initial values and parameters modified by the control error in the n-th commutation period of one revolution are stored as the n-th initial values and parameters and used once per revolution only in the n-th commutation period of one revolution so as to make independent current control at each commutation period for realizing the motor drive torque matched with the load torque at each commutation period and the low-vibration compressor operation.

Further, according to this invention, there is provided a current control method wherein the pulse-width modulation signal period is initialized at each commutation period, and the pulse-width modulation signal is made on at the same time as when the commutation occurs, so that the motor model means can be continuously operated for stable current control.

Further, according to this invention, there is provided a current control method wherein the pulse width modulation signal synchronized with the commutation is generated and initialized in a short processing time by an external signal or internal signal.

Further, according to this invention, there is provided a current control method for controlling a load current to be adjusted to substantially the same response, or to rise from zero current to an arbitrary current command value at each first period with which a constant load current response is repeated, comprising the steps of generating an assumed response for fixing the rise response to a specified form, sequentially generating a current flow rate as an input to a load on the basis of an initial value and a parameter by using load model means which is a time function having the initial value for the load current response coincident with this assumed response, and which has at least one parameter for altering this function form, detecting the error between the current detected value and the assumed response associated with this detected current value, and at the end of each period, modifying the initial value stored in a readable and writable memory element of the load model means in accordance with the integrated value of the current error within this period, repeatedly modifying the parameter by the error of a particular response in the response waveform, or the speed of rise or the like, thereby to make the average current within the commutation period coincident with an arbitrary command value and to make the response form coincident with the assumed response, and changing the assumed response form in accordance with circulation current upon commutation so that the motor can be always driven by a constant drive torque to have low vibration.

Further, according to this invention, there is provided a compressor system using the above motor wherein a current command is generated for the commutation period in which the motor drive torque is generated in accordance with the load torque at each rotational position of the motor and the motor current coincident with this current command is caused to flow so that the compressor can be driven with the load fluctuation associated with the compression being removed and with low vibration.

Furthermore, according to this invention, there is provided an air blower system using the above motor, wherein

BRIEF DESCRIPTION OF THE DRAWINGS

FIG. 5 is a block diagram of a third embodiment of a current controller for a motor according to this invention;

DESCRIPTION OF THE PREFERRED EMBODIMENTS

One embodiment of this invention will be described with reference to FIGS. 1A and 1B.

The first embodiment of this invention is concerned with a current controller which provides a current response by repetition of the current to a load.

Figure 1A:
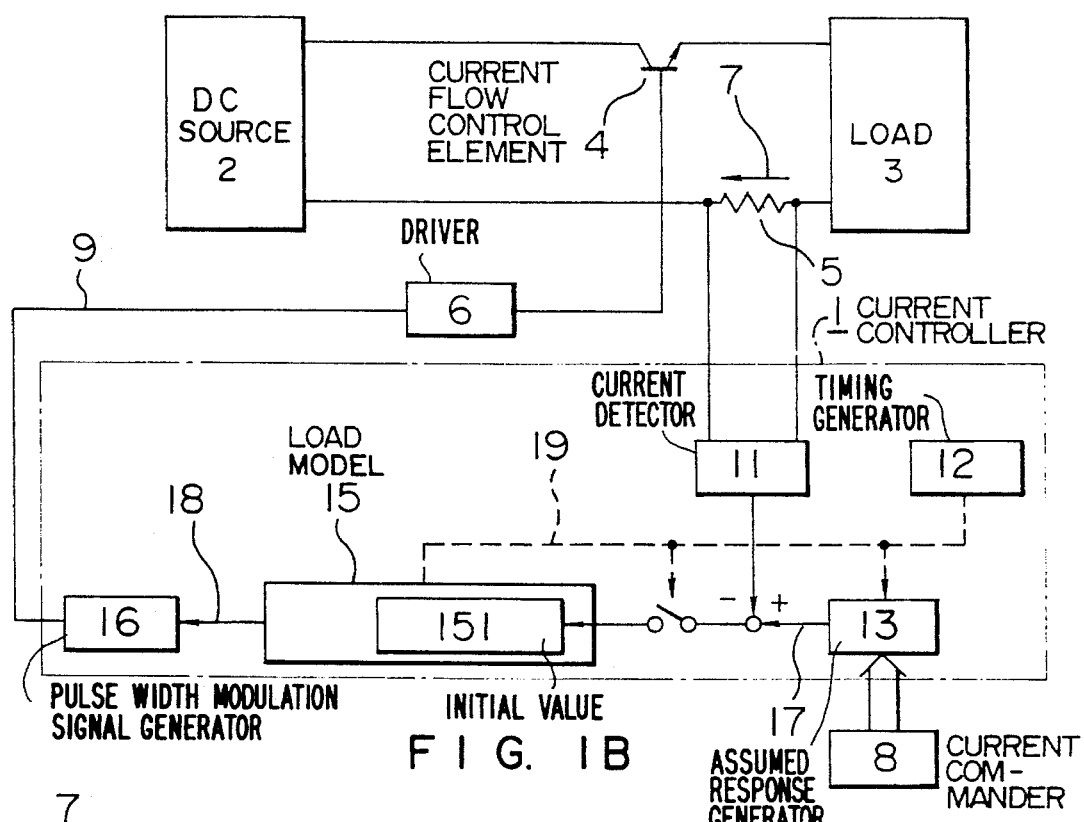
FIG. 1A is a block diagram showing a basic configuration of a current controller in accordance with this invention.

That is, FIG. 1A shows the whole arrangement and operation of a DC controller 1 for controlling the DC current to a load.

A DC current source 2 supplies a DC current 7 through a current flow control element 4 to a load 3.

The current controller 1 detects the voltage developed across a current detection resistor 5, and supplies a pulse width modulated signal 9 to a driver 6 so that the DC current 7 coincides in average value with a current command from a current commander 8. The driver 6 controls the current flow control element 4 to pass the current to the load only when the pulse width modulated signal 9 is on.

Figure 1B:
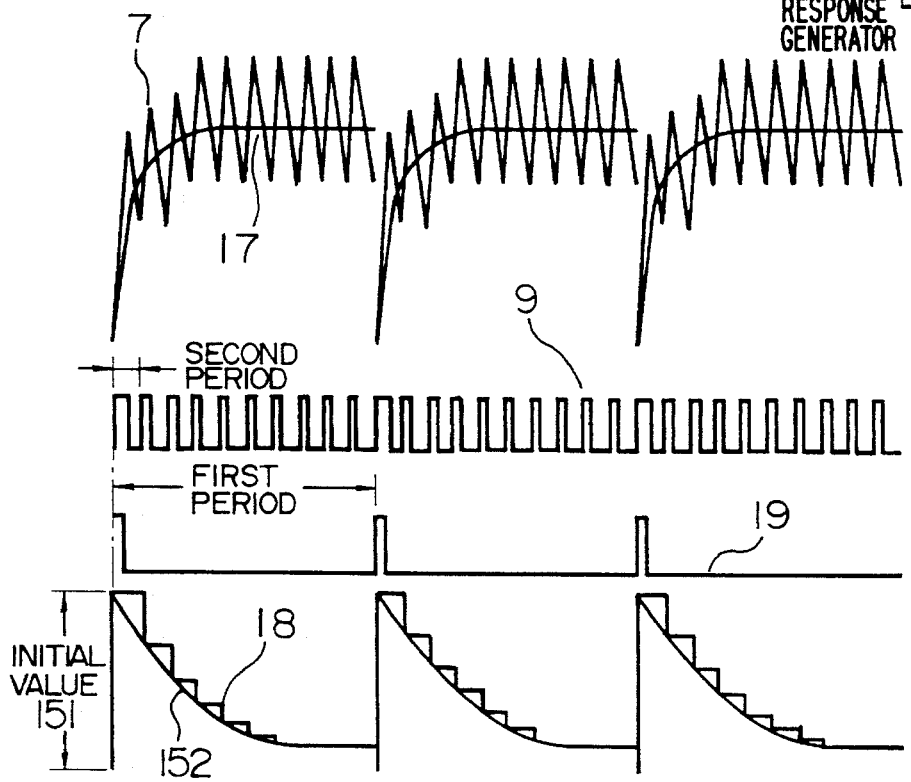
FIG. 1B is a waveform diagram of the currents flowing in the circuits shown in FIG. 1A.

The DC current 7, as shown in FIG. 1B, repeats in a constant period (first period) during which it rises from zero to a command value.

The current controller 1 comprises a timing generator 12, a current detector 11, an assumed response generator 13, and a load (dummy) model 15 specifying an initial value 151 and determining a change of current flow rate by computation using the initial value to thereby generate scattered flow rates in each second period; A pulse width modulation signal generator 16 is responsive to the output 18 of the load dummy 15 to probe the signal 9.

The timing generator 12 generates a timing signal 19 at each constant period (first period), thereby initializing the assumed response generator 13 and the load model 15 and permitting the initial value 151 of the load model 15 to be modified.

The assumed response generator 13, when initialized by the timing generator 12, generates an assumed response (current pattern) 17 which rises from zero to the command value as shown in FIG. 1B. The error between the assumed response 17 and the detected current which is detected at least once in the pulse width modulation signal period is accumulated until the next timing signal is generated (during the first period), and the initial value 151 of the load model 15 is modified using the accumulated value of the error at each timing signal.

The load model 15 has a readable memory element which has stored therein a time function 152 obtained from an input-output relation for determining the response of the load on a time basis, and generates a current flow rate 18 at each second period from this function and the initial value 151 in accordance with the time lapse after the generation of each timing signal 19.

The pulse width modulation signal generator 16 generates the pulse width modulation signal 9 having a given current flow rate as shown in FIG. 1B.

Thus, by repeating the modification of the initial value 151 of the load model using the accumulated value of the error within the first period, it is possible to produce a DC current 7 which coincides in average value with the level of the assumed response 17.

This embodiment of the invention has the effect of realizing a periodic response repeating current which agrees with an arbitrary assumed response.

Moreover, this embodiment has the effect that the current controller 1 can be implemented by use of a microcomputer and the influence of delay due to the sampling can be removed.

Figure 2:
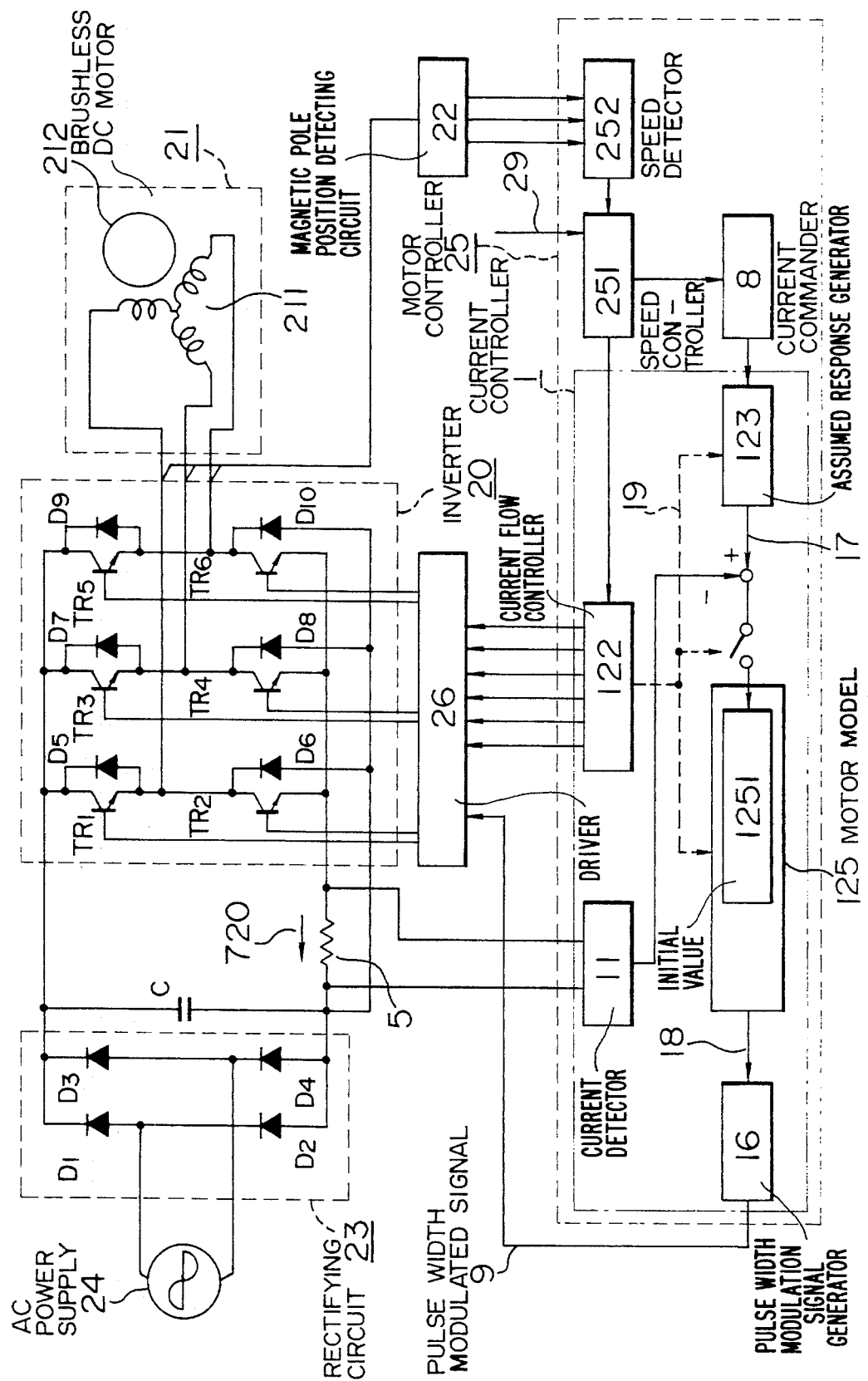
FIG. 2 is a block diagram of an embodiment of a current controller for a motor in accordance with this invention.

A specific embodiment of this invention will be described with reference to FIG. 2. FIG. 2 shows the current controller 1 for control of a 120-degree current flow type inverter 20.

The alternating current from an AC power supply 24 is rectified by a rectifying circuit 23 formed of diodes D1 to D4, and smoothed by a capacitor C into a DC current relative to the inverter 20. This inverter 20 is a 120-degree current flow type inverter which is formed of transistors TR1 to TR6 and circulation diodes D5 to D10. The AC output voltage therefrom is controlled by the fact that the current flow period (120 electrical angles) of the transistors TR1, TR3, TR5 on the positive potential side of the DC voltage is chopped by the pulse width modulation. Also, the current detection resistor 5 is connected between the common emitter terminal of the transistors TR2, TR4, TR6 and the common anode terminal of the circulation diodes D6, D8, D10.

Shown at 21 is a brushless DC motor which is a four-pole synchronous motor having a permanent magnet 212 for providing a magnetic field. The winding current flowing in an armature winding 211 also flows in the current detection resistor 5, and thus the winding current 720 can be detected from the voltage drop developed across the resistor 5.

A motor controller 25 is formed by a microcomputer and operates in the following manner.

That is, a magnetic pole position detecting circuit 22 formed of filter circuits generates position detected signals corresponding to the position of the rotor by utilizing the voltages induced in the three-phase winding. The position detected signals are changed twelve times during each revolution because of use of the three-phase, four-pole motor. In the motor controller 25, the position detected signals are observed, and the time interval between the occurring changes of the position detected signals is measured and compensated for the delay in the filters by a speed detector 252, so that the speed is detected.

A speed controller 251 supplies to the current commander 8 a signal representing an amount of modification according to the difference between a target speed command 29 and the speed measured by the speed detector 252. Also, this speed controller 251 supplies to a current flow controller 122 a signal representing an amount of time for a current flow mode or the time corresponding to the 60 electrical angles, in accordance with the measured speed.

Thus, the current flow mode of the inverter is controlled on and off in accordance with the rotation speed, and the current command is produced for driving the motor at the rotation speed matched with the target speed command 29.

The current controller 1 is substantially of the same construction as shown in FIG. 1.

When the motor using the 120-degree current flow type inverter is driven by this motor controller 25, the DC current 720 has the same waveform 7 as shown in FIG. 1B, which repeats during each current flow mode switching period. Thus, the timing generator can be implemented in the form of a current flow controller 122, which thus generates the timing signal 19 for initializing each element at the time of switching the current flow mode on and off.

The elements of the current controller 1, including the motor current assumed response generator 123, the motor model 125 and the motor model initial value 1251, are determined in accordance with the winding resistance, winding inductance and induced voltage constants of the motor. The current controller 1 including these elements produces the pulse width modulation signal 9 on the same principle as described with reference to FIG. 1.

The driver 26 can perform the chopping operation by modulating part of the current flow signal from the current flow controller 122 in accordance with the pulse width modulation signal 9.

According to the second embodiment, the DC current to be supplied to the 120-degree current flow type inverter, which is switched on and off in the current flow mode at each 60 electrical degrees, can be made coincident with the command value within the commutation period and with an arbitrary assumed response.

Figure 3:
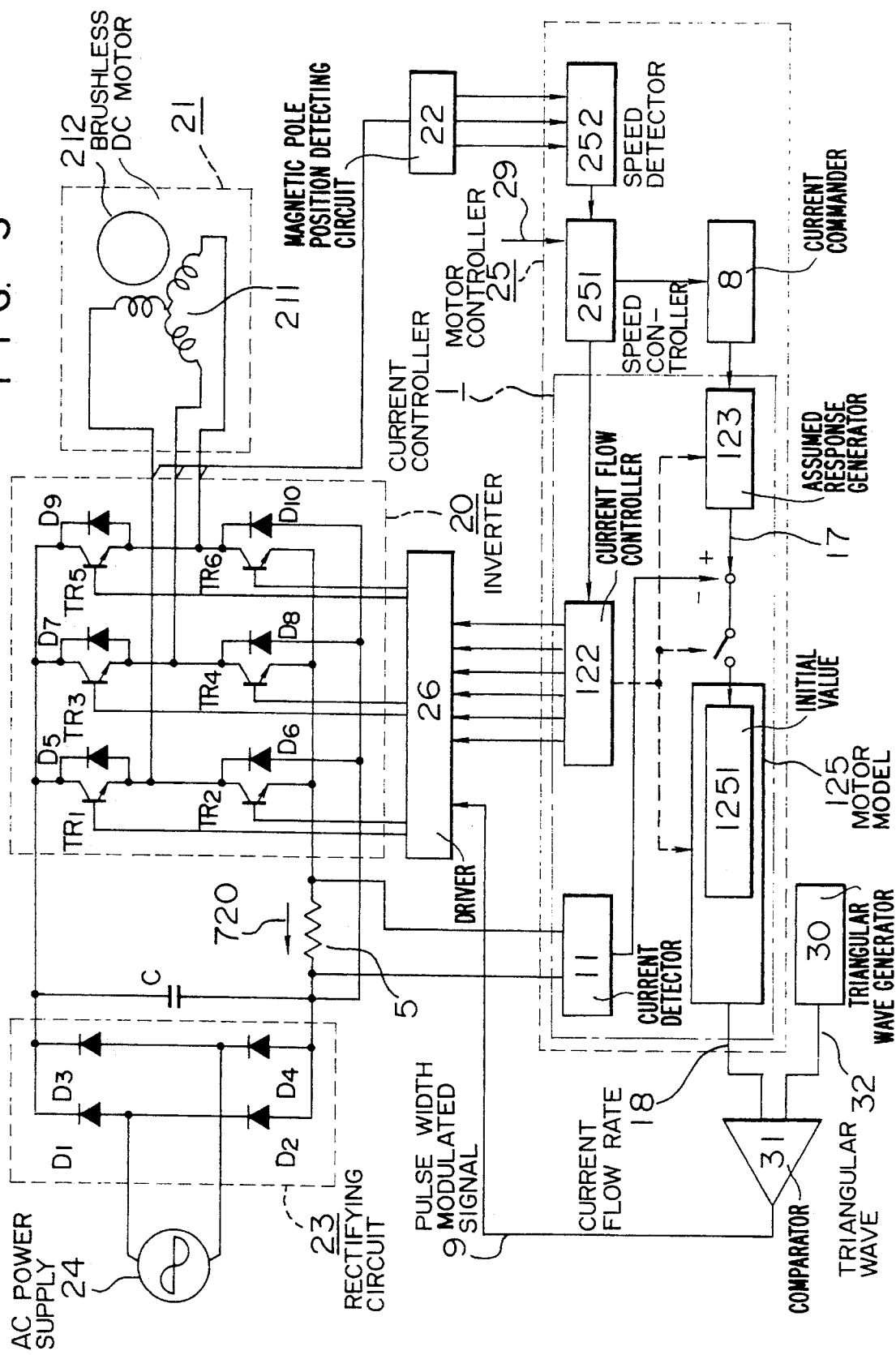
FIG. 3 is a block diagram of a second embodiment of a current controller for a motor in accordance with this invention.

A second embodiment of this invention will be described with reference to FIGS. 3 and 4. FIG. 3 shows an embodiment for the current control of a 120-degree current flow type inverter.

In FIG. 3, like elements corresponding to those in FIG. 2 are identified by the same reference numerals.

In this embodiment of the invention, the motor controller 25 produces the current flow rate signal 18 at its output.

Shown at 30 is a triangular wave generator, which generates a triangular wave signal 32 having a constant period.

The current flow rate signal 18 and the triangular wave signal 32 are compared with each other by a comparator 31. When the current flow rate is larger than the triangular wave, the pulse width modulated signal 9 is turned on.

Figure 4:
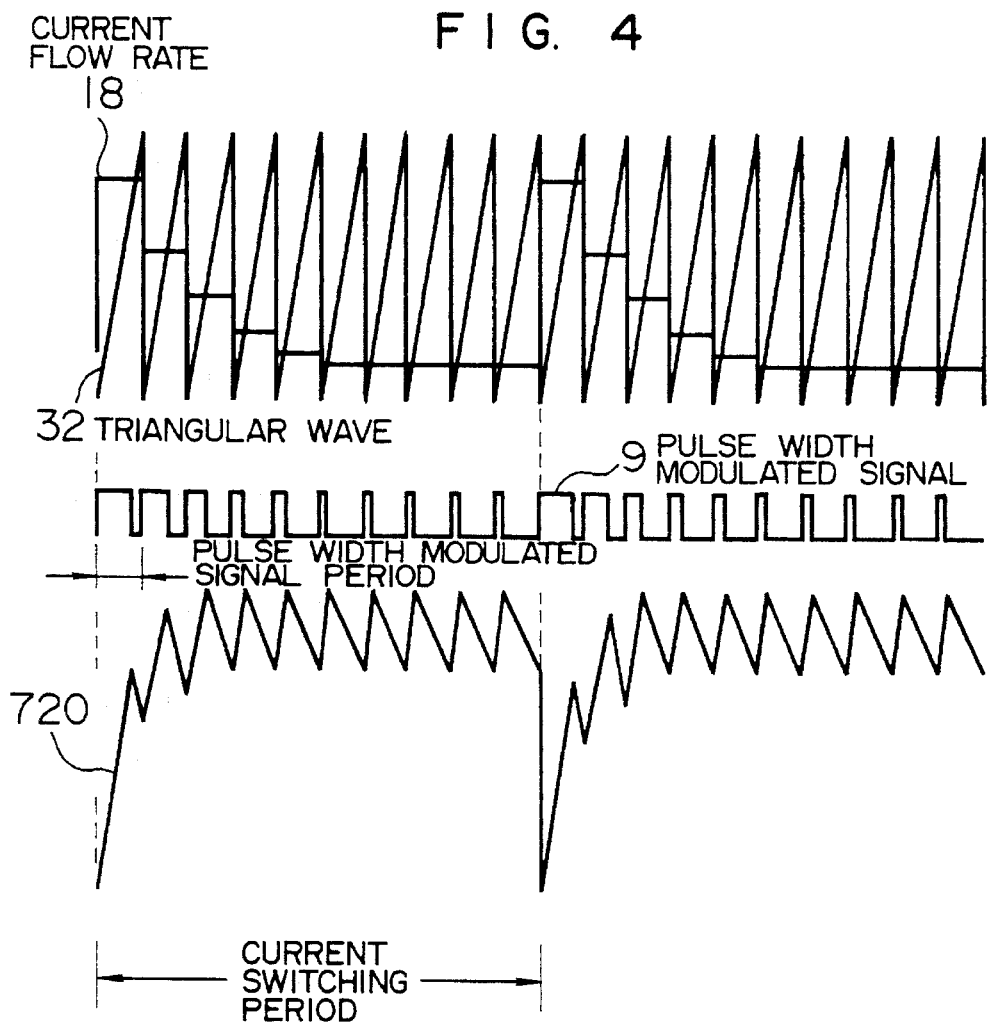
FIG. 4 is a diagram useful for explaining the principle of the operation of the current controller shown in FIG. 3.

FIG. 4 shows these waveforms. The pulse width modulation signal 9 controls the inverter 20 to be supplied with a DC current 720 as shown in FIG. 4.

According to this second embodiment, there is no need to produce in real time the pulse width modulation signal by the microcomputer, the current flow rate can be changed substantially in synchronism with the triangular wave, and the current control can be realized by the microcomputer with no function to generate the pulse width modulation signal.

A third embodiment of this invention will be described with reference to FIG. 5. FIG. 5 shows the an embodiment for the current control a 120-degree current flow type inverter.

In FIG. 5, like elements corresponding to those in FIG. 2 are identified by the same reference numerals. In this embodiment, a proportion controller 140 is connected in parallel with the motor model 125.

The proportion controller 140, when the DC current is detected by the current detector 12, produces a signal indicating an amount by which the current flow rate 141 is to be modified by use of the error between the detected current and the assumed response at this time point, thereby modifying the current flow rate 18 which is produced from the motor model 125. This modification is made as soon as possible after the current detection.

This third embodiment has the effect to suppress the nonsynchronous external disturbance and sudden external disturbance in the commutation period.

Figure 6:
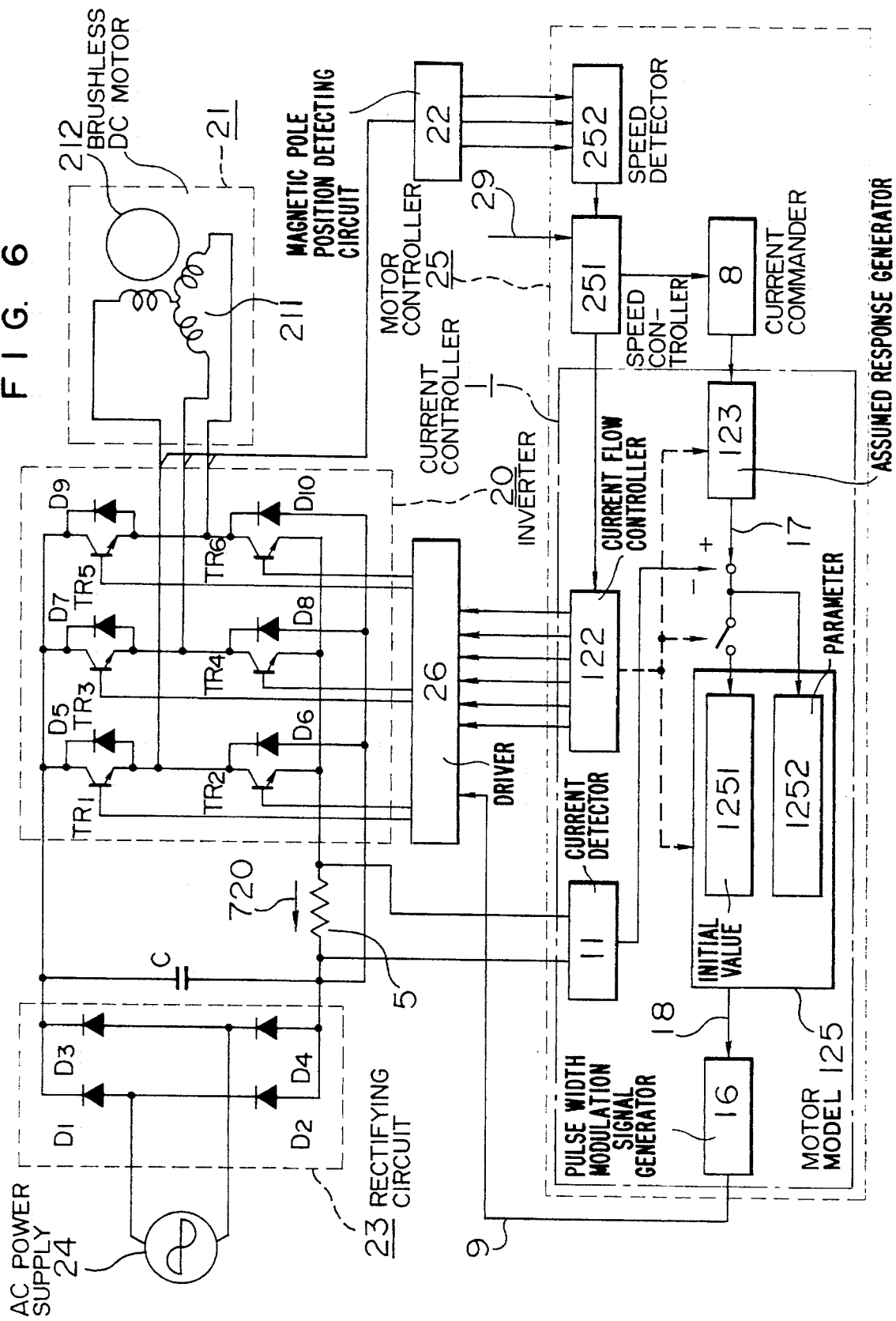
FIG. 6 is a block diagram of a motor controller of a fourth embodiment of this invention.

A fourth embodiment of this invention will be described with reference to FIG. 6. FIG. 6 shows an embodiment for the current control of a 120-degree current flow type inverter.

In FIG. 6, like elements corresponding to those in FIG. 2 are identified by the same reference numerals.

In this embodiment, the motor model means 125 stores the initial value 1251 and one parameter 1252. The current flow rate 18 just before being produced is multiplied by this parameter.

The parameter 1252, when the DC current is detected by the current detector 11, is modified by the error between the detected current and the assumed response 17 at this time point. This modification is made as soon as possible after the current detection.

This embodiment has the effect to suppress the nonsynchronous external disturbance and sudden external disturbance in the commutation period.

Figure 8:
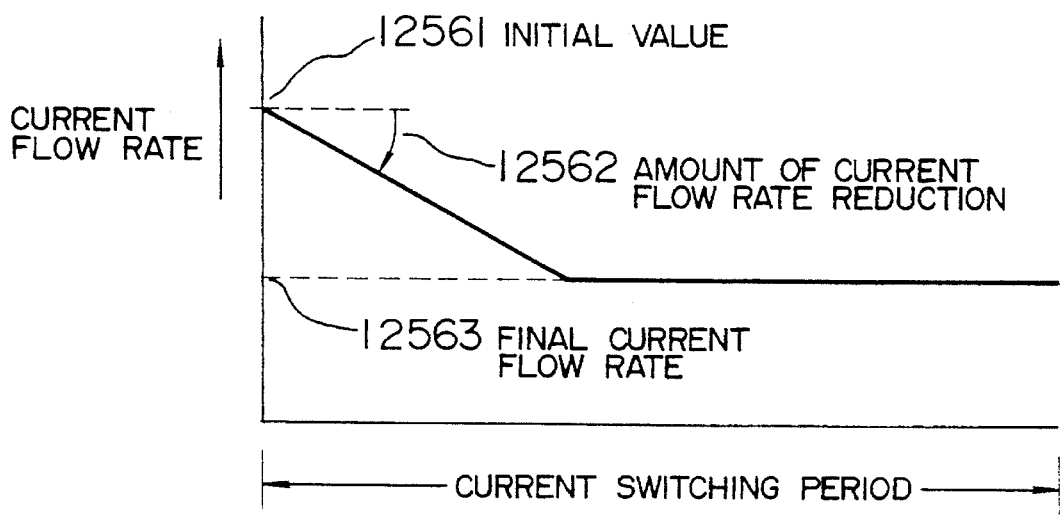
FIG. 8 is a characteristic diagram of the current flow rate of the motor model shown in FIG. 7.
Figure 7:
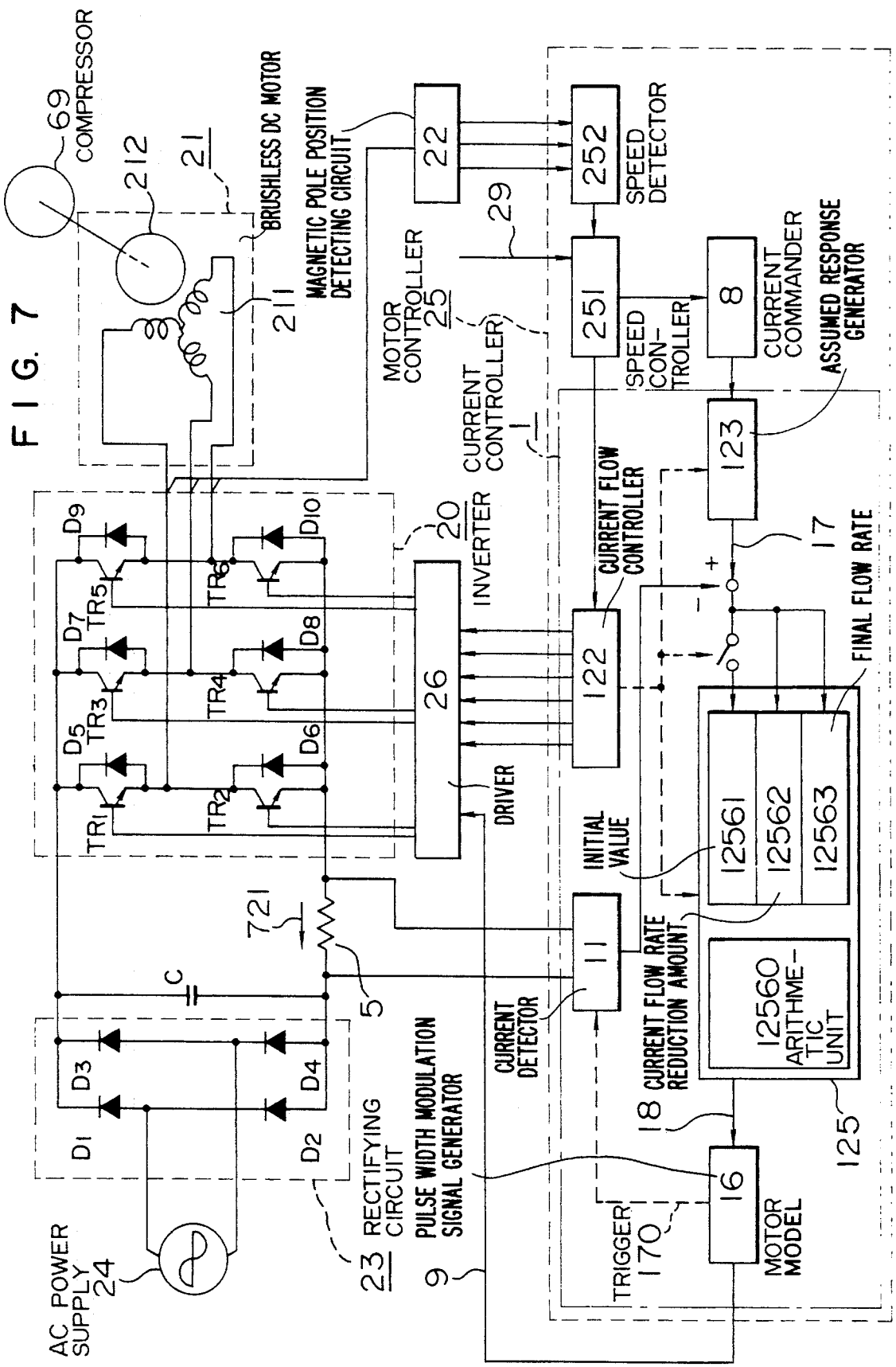
FIG. 7 is a block diagram of a fifth embodiment of a current controller for a compressor drive motor in accordance with this invention.

A fifth embodiment of this invention will be described with reference to FIGS. 7 and 8. FIG. 7 shows an embodiment for the current control of a 120-degree current flow type inverter. In FIG. 7, like elements corresponding to those in FIG. 2 are identified by the same reference numerals.

In this embodiment, the load on the motor 21 is a compressor 69. The common anode terminal of the circulation diodes D6, D8, D10 on the low potential side of the inverter 20 are directly connected to the common emitter terminal of the transistors TR2, TR4, TR6.

Therefore, the circulation current, or the current flowing in the diodes D6, D8 and D10 cannot be detected by the current detection resistor 5. Also, the current during the time in which the transistors TR1, TR3, TR5 on the positive potential side are all in the off state cannot be detected because it does not flow in the current detection resistor 5.

The motor controller 25 is of the same construction as shown in FIG. 2.

Since the current detector 11 takes part of the winding current flowing through the current detection resistor 5, the current detection is made by first obtaining a trigger 170 during the time in which the pulse width modulation signal from the pulse width modulation signal generator 16 is in the on-state.

The motor model 125 stores three values of modification; an initial value 12561, an amount of parameter current flow rate reduction 12562 and a final flow rate 12563. FIG. 8 shows the relation between the amounts of modification and the current flow rate. A calculator unit 12560 generates the current flow rate with respect to time after commutation by use of the initial value 12561 and the parameters 12562 and 12563.

The modification of the initial value 12561 is made in accordance with the difference between the current detected value and the assumed response within one commutation period.

The amount of current flow rate reduction 12562 of the parameters is modified in accordance with the error between the speed of rise of current and that of the assumed model up to the second pulse of the pulse width modulation signal after commutation.

The other parameter, or the final flow rate 12563 is modified in accordance with the error in the current value detected immediately before the commutation.

This embodiment has the effect that the current control can be made in accordance with the change of the state of the compressor as the load and the change of constants of the motor.

Figure 9:
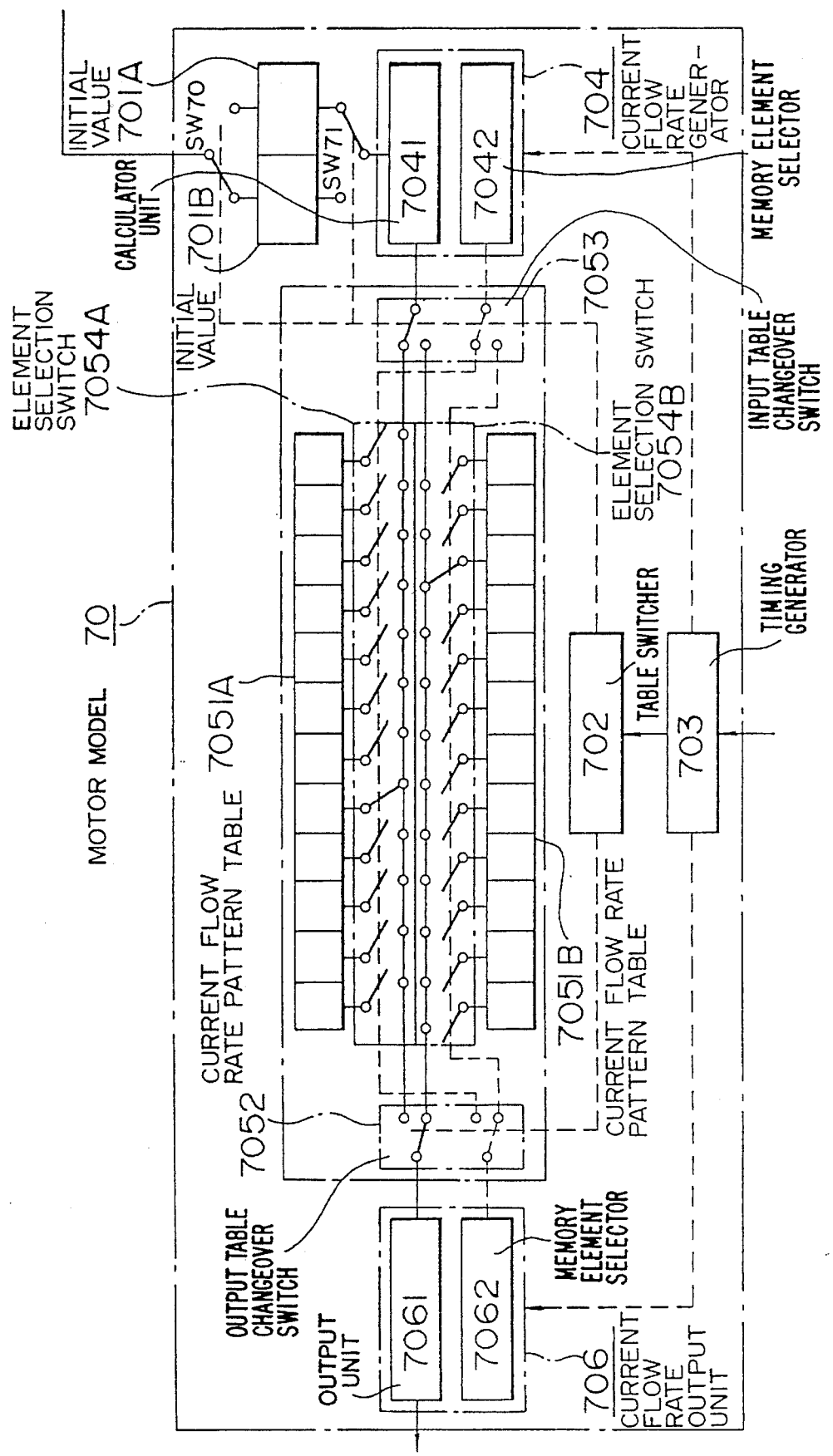
FIG. 9 is a block diagram of a modified motor model in accordance with this invention.

FIG. 9 shows a modified motor model in which two current flow rate pattern tables 7051A and 7051B and two initial values 701A and 701B are provided.

The initial values 701A and 701B are stored in memory elements capable of reading and writing, which are alternately switched for modification and reading at each 60 electrical degrees by switches SW 70 and SW 71.

A flow rate generator 704 comprises a calculator unit 7041 and a memory element selector 7042. The flow rate data calculated using the initial value by the calculator unit 7041 is sequentially stored in a selected one of the current flow rate pattern tables 7051A, 7051B as memory elements capable of reading and writing, which selection is made by the memory element selector 7042. This sequential storing in the tables is made by element selection switches 7054A and 7054B, respectively.

A current flow rate output unit 706 comprises an output unit 7061 and a memory element selector 7062. Data of memory elements sequentially selected by the memory element selector 7062 at each period of the pulse width modulation signal are produced through the output unit 7061.

A table switcher 702 is responsive to a current switching timing signal generated from a timing generator 703 to control input and output table changeover switches 7052, 7053 and the switches SW70, SW71 for switching between the initial values during operation.

Figure 10:
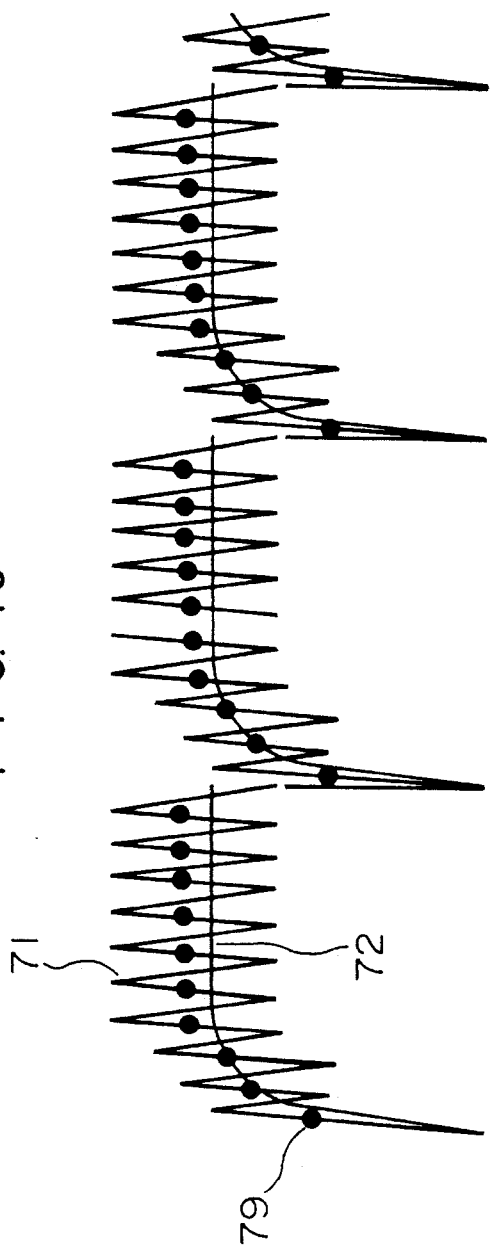
FIG. 10 is a diagram useful for explaining the operation of the motor model shown in FIG. 9.

This operation will be described with reference to FIG. 10.

A pulse width modulation signal 73 is sequentially produced from an output table 78 as a selected current flow rate pattern table. The output of the modulation signal is produced by sequentially switching the memory elements at each period of the pulse width modulation signal 75.

The error between a detected value 79 of a DC current 71 flowing in response to the pulse width modulation signal and an assumed response 72 is accumulated as an modified initial value 76.

The current flow rate pattern is stored in the selected table of one current flow rate table, or generation table 77. The initial value used in the current flow rate table generation is not selected as the modified initial value.

The writing operation to the generation table is sequentially made at a high speed irrespective of the period of the pulse width modulation signal.

The modified initial value and generation/output table are alternately switched at each commutation period.

This embodiment has the effect that the current flow rate is produced at a high speed at each period of the pulse width modulation signal.

Figure 11:
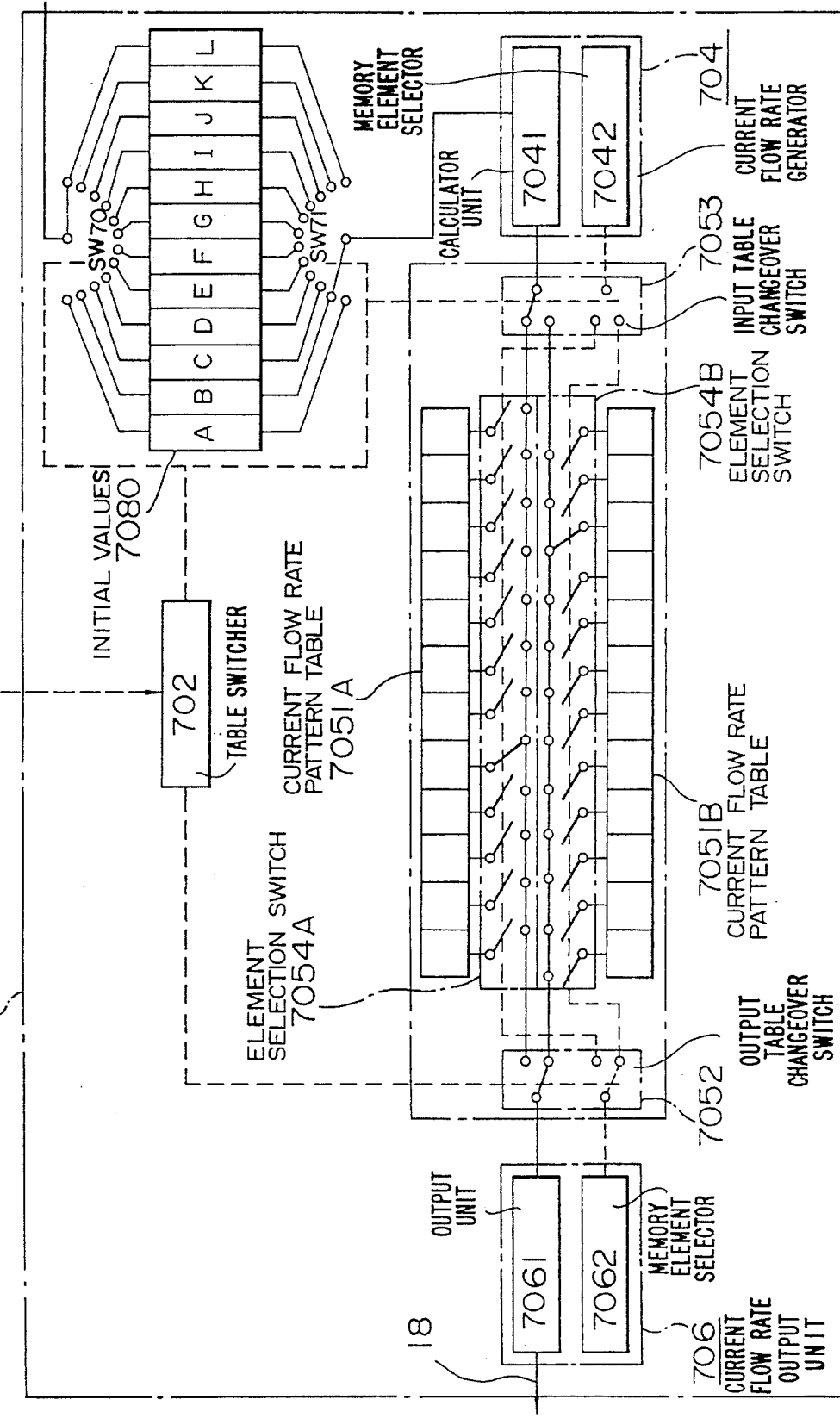
FIG. 11 is a block diagram of another motor model in accordance with this invention.

Another motor model in accordance with the invention will be described with reference to FIGS. 11 and 12. FIG. 11 shows a motor model 180 which has 12 initial values 7080 associated with the magnetic pole position detected modes during one revolution of the three-phase 4-pole motor, and thus which is different in that point from the motor model shown in FIG. 9. In FIG. 11, like elements corresponding to those in FIG. 9 are identified by the same reference numerals.

Figure 12:
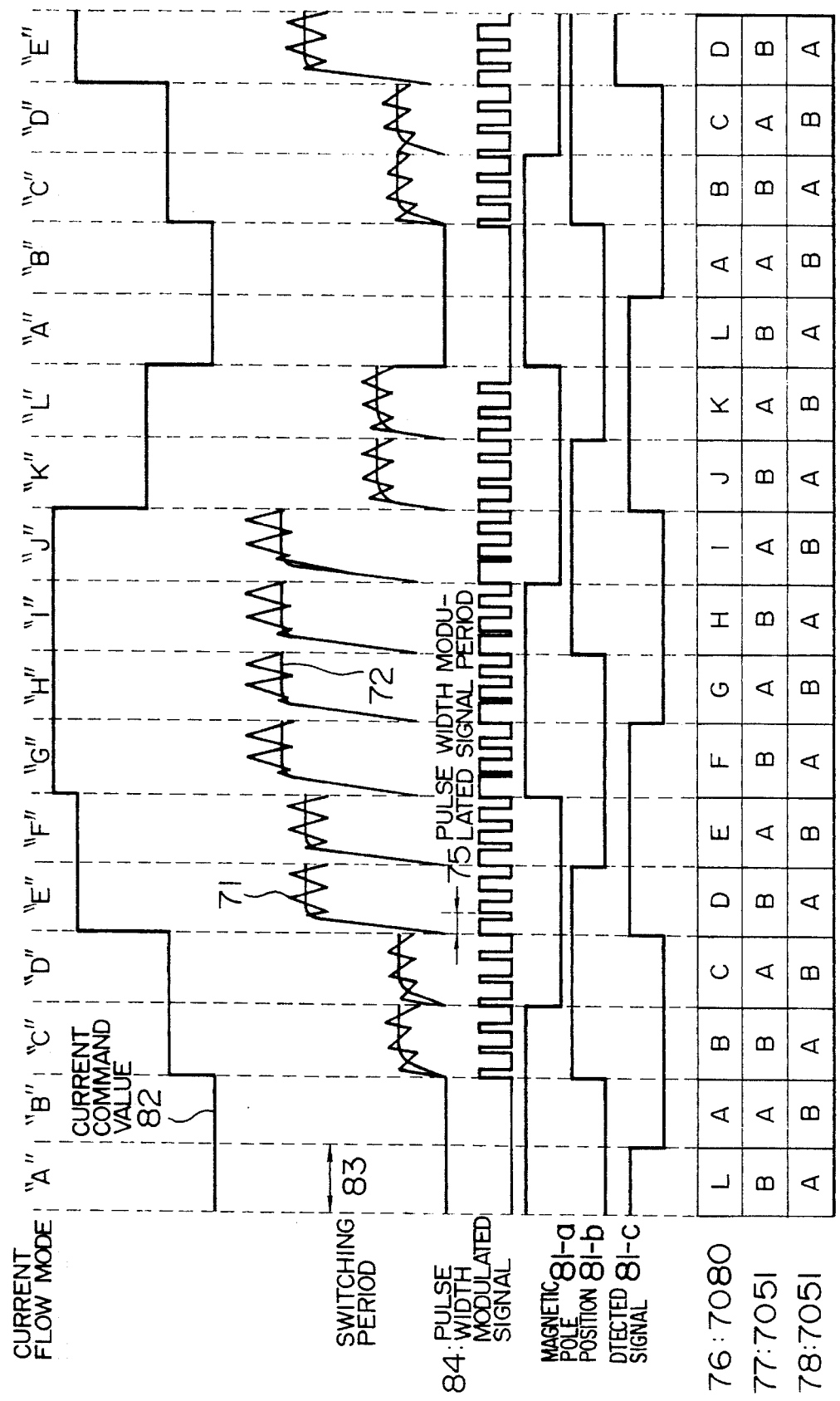
FIG. 12 is a diagram useful for explaining the operation of the motor model shown in FIG. 11.

The selection of the generation table 77 and the output table 78 of the current flow rate table is made by the same procedure as in FIG. 9. 1 The method of selecting the initial values 7080 will be mentioned with reference to FIG. 12 which is a diagram for explaining the operation.

Three-phase magnetic pole position detected signals 81a, 81b and 81c are changed 12 times during one revolution of the motor, and thus there are 12 current flow modes, "A" to "L" corresponding to the motor rotation positions.

The initial values 7080 are modified after the corresponding current flow mode of 60 electrical degrees (commutation period) 83.

The flow rate pattern table is generated by use of the initial value corresponding to the current flow mode next to the flow mode at that time.

For example, in the current flow mode "C" the initial value 7080B is modified by use of the controlled result in the current flow mode "B". On the other hand, the current flow rate pattern table 7051B is generated by use of the initial value 7080D.

The pulse width modulation signal is produced in accordance with the current flow rate pattern table 7051A generated by use of the initial value 7080C in the current flow mode "B".

This embodiment has the effect that a command value different at each 60 electrical angles can be realized by independent current control at each revolutional position of the motor.

Figure 13:
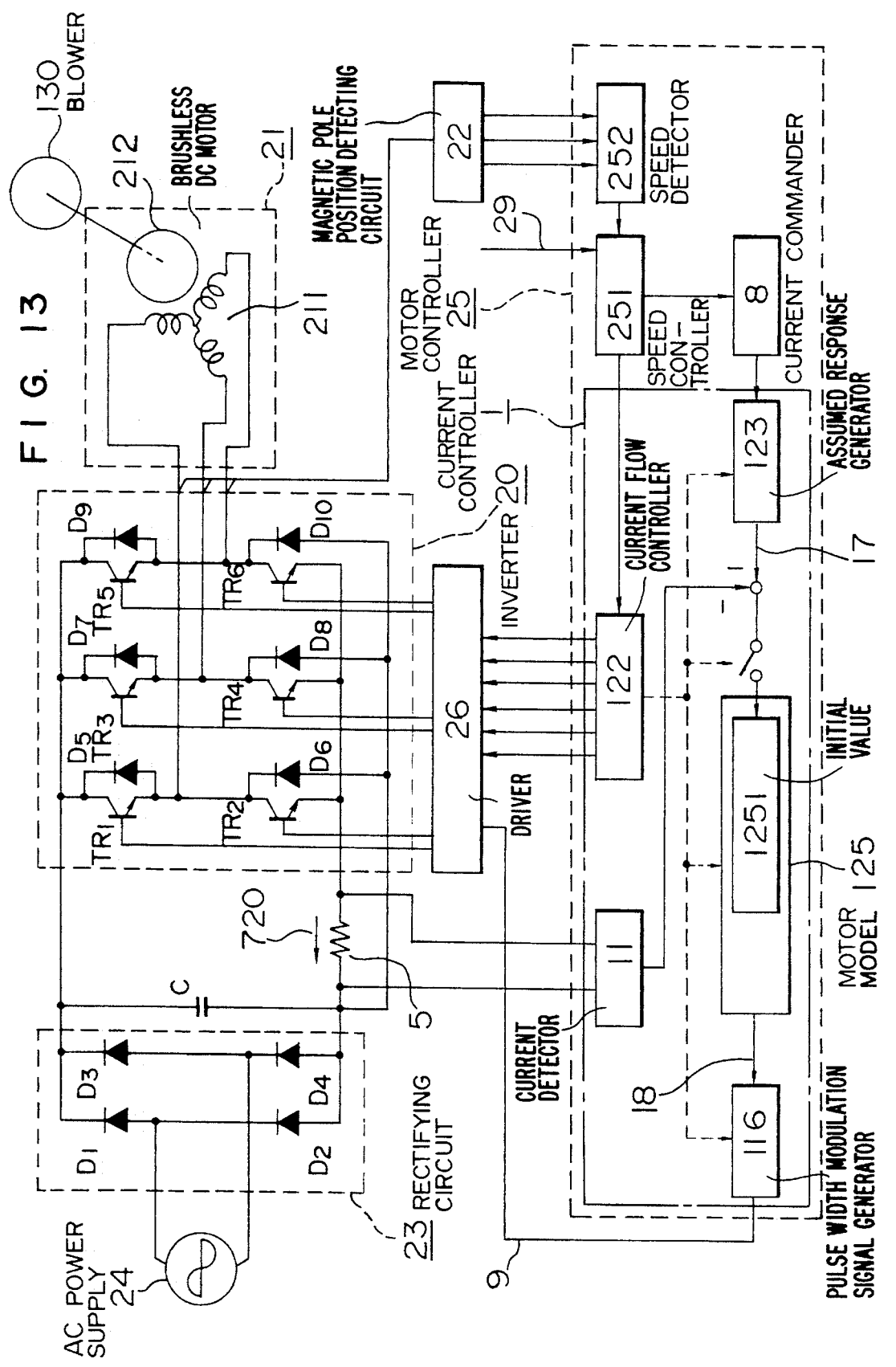
FIG. 13 is a block diagram of a motor controller similar to that of FIG. 2 in which the load of the motor is an air blower.

FIG. 13 shows an arrangement for the current control to the 120-degree current flow type inverter similar to that of FIG. 2. In FIG. 13, in which like elements corresponding to those in FIG. 2 are identified by the same reference numerals, the load on the motor is an air blower 130, and the pulse width modulation signal generator 116 is initialized at each commutation timing signal.

Figure 14:
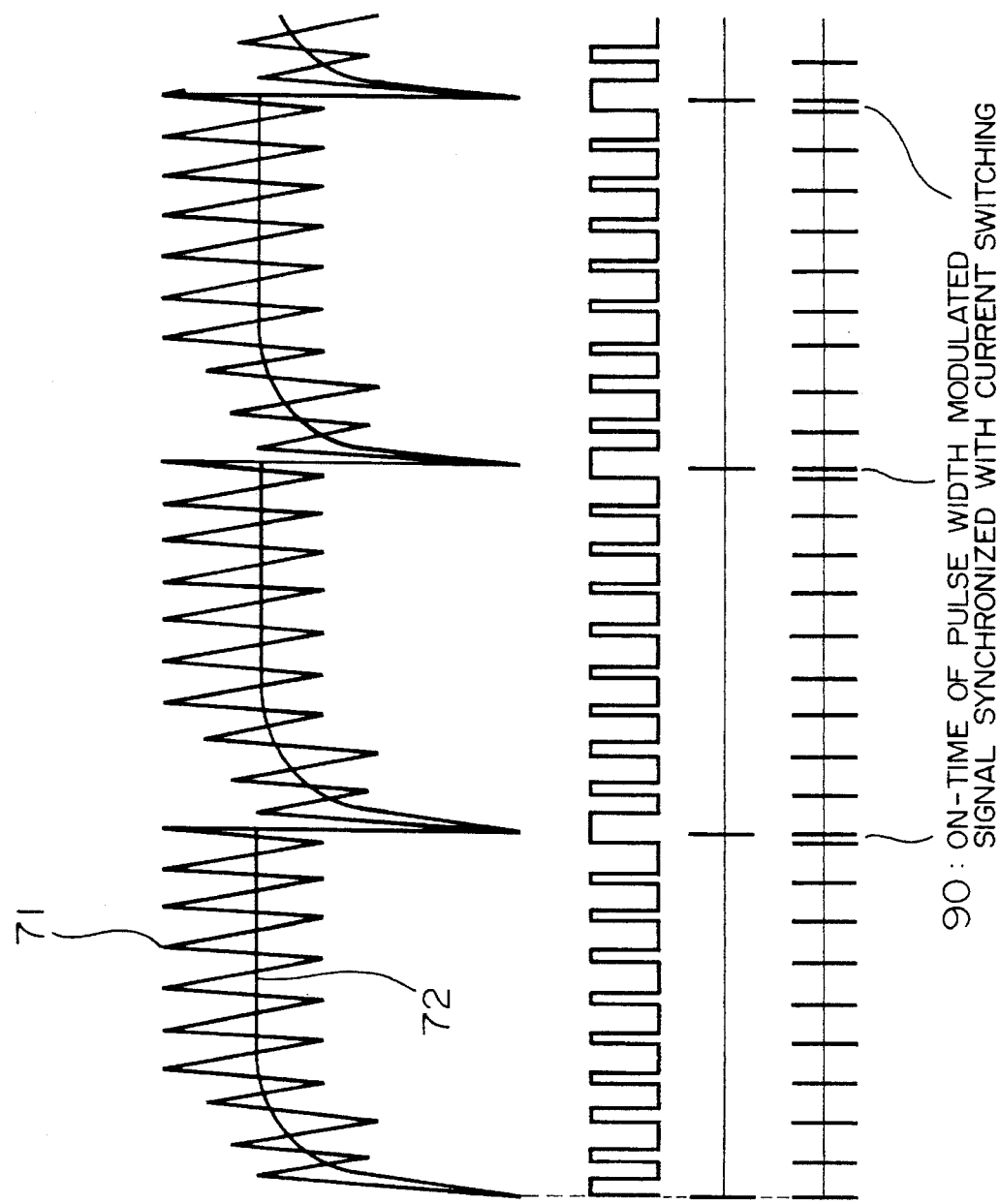
FIG. 14 is a waveform diagram useful for explaining the operation of the arrangement of FIG. 13.

This situation will be mentioned with reference to FIG. 14 which is a diagram for explaining the operation. The pulse width modulation signal with the constant pulse width modulation signal period 75 is produced which turns zero at the commutation point.

The commutation period 74 is changed in accordance with the rate of revolution of the motor irrespective of the pulse width modulation signal. When the commutation is caused as at 90 in FIG. 14, the pulse width modulation signal is initialized so that it is always on at the time of commutation.

Thus, the DC current 71 indicates the average value coincident with the assumed response 72, not depending on the timing of the commutation.

The ninth embodiment has the effect that a constant response coincident with the assumed response can be realized for all rates of revolution, and thus the effect to reduce the fluctuation of the rotation of the air blower.

Figure 15A:
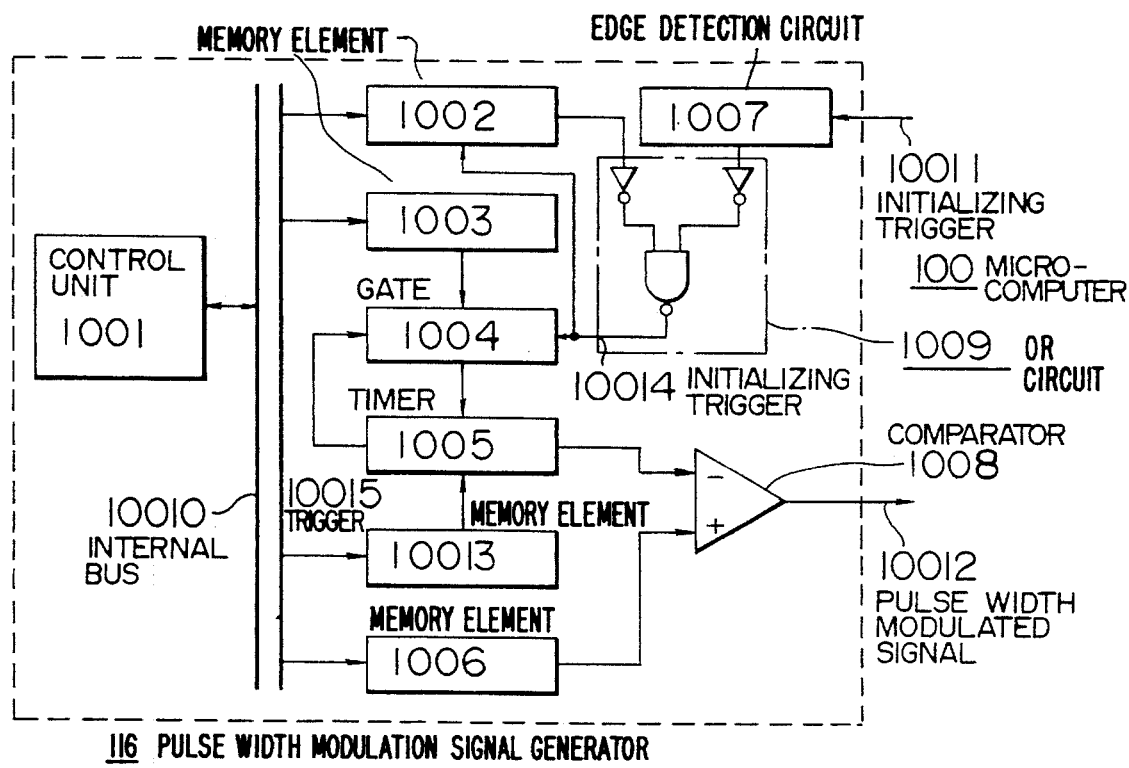
FIG. 15A is a block diagram of the calculator unit of the pulse width modulation signal output unit used in the arrangement shown in FIG. 13.

FIG. 15A shows an example of the pulse width modulation signal generator 116 for producing the pulse width modulation signal synchronized with the commutation in FIG. 13. This example employs one output function of a microcomputer.

An initializing trigger 10011 is supplied to a microcomputer 100, and a pulse width modulation signal 10012 is produced therefrom.

A timer 1005 is a memory element capable of reading and writing and in which the value is increased or decreased at constant intervals of time. When the value of the timer exceeds the maximum or minimum value, it produces a trigger 10015, by which a gate 1004 is opened so that the initial value stored in a memory element 1003 is read in and that the counting is again started. The memory element 1003 can be controlled by a control unit 1001 through an internal bus 10010 to store an arbitrary value.

The control unit 1001 controls a memory element 10013 to store 0 or 1 through the internal bus 10010 so that a timer 1005 is set to an increase or decrease mode.

A memory element 1006 is controlled by the control unit 1001 to store a value through the internal bus 10010.

A comparator 1008 compares the value of the timer 1005 and the content of the memory element 1006. When the content of the timer 1005 is smaller than that of the memory element, the comparator 1008 turns the pulse width modulation signal 10012 off, and when the content of the timer 1005 is larger than that of the memory element, the comparator turns it on.

Thus, the pulse width modulated signal with a constant period can realize the current flow rate given by the memory element 1006.

The timer 1005 is also initialized by an initializing trigger 10014.

This initializing trigger 10014 is produced when the control unit 1001 controls the memory element 1002 to store 1 through the internal bus. This trigger can initialize the memory element 1002 into 0.

Figure 15B:
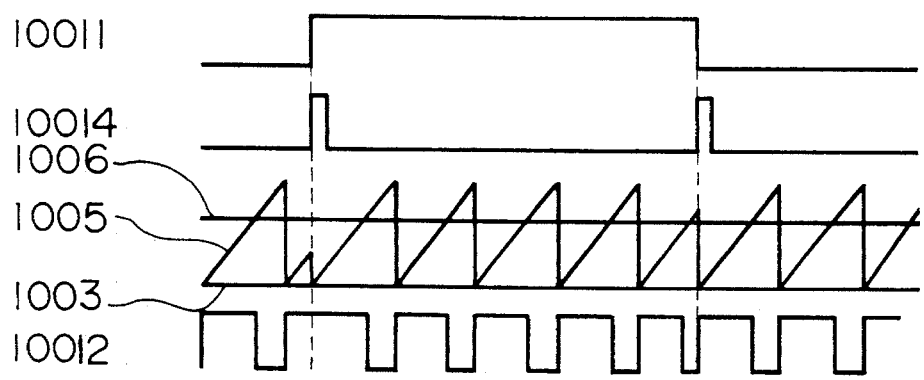
FIG. 15B is a waveform diagram of the synchronizing signals in the elements of the calculator unit shown in FIG. 15A.

Also, the initializing trigger 10011 produces a further trigger. In other words, an edge detection circuit 1007 detects the edges of the initializing trigger 10011 and produces a trigger as shown in FIG. 15B. This trigger and the trigger from the memory element 1002 controlled by the control unit 1001 are supplied to an OR circuit 1009, which selects the trigger signals, by which the gate 1004 is opened, permitting the initial value of the memory element 1003 to be supplied therethrough to the timer 1005. Thus, the pulse width modulation signal is initialized at the time of the trigger generation.

According to the present invention, since the pulse width modulation signal having an arbitrary pulse width is produced not through the software of the microcomputer, and since this signal can be simply initialized, the pulse width modulation signal can be produced without interrupting other processings.

Therefore, according to this invention, since periodic DC current control can be realized only by modifying the initial value at each repetitive period, using the load model which has variable initial values, the current controller can be realized without using any discrete analog circuit.

Moreover, according to this invention, since the time response of the motor is included as a motor model, the DC current control, when the current control is made only by a microcomputer, can be made by the detection of a little current, or by detecting current about once each period of the pulse width modulation signal, and a current matched with the command can be realized within 60 electrical degrees.

Also, according to this invention, since the current control can be realized even without high speed output by selecting a voltage except the current flow rate as the output of the motor model means, it is possible to use the microcomputer having no pulse width modulation signal generating means together with a few discrete components such as a triangular wave generator and a comparator, for realizing the current control and arbitrary current response.

Moreover, according to this invention, since means is provided which causes the result of current detection to reflect the current flow rate in about two periods of the pulse width modulation signal, an external disturbance and a sudden external disturbance not in synchronism with the commutation can be suppressed.

Moreover, according to this invention, since a parameter is provided which can be modified in accordance with the change of the response to the current rise, and since the average current and current response can be independently controlled, it is possible to perform the current control according to the state change of the motor, or the change of induced voltage change and the change of constants such as the resistance of the winding.

Moreover, according to this invention, since the current flow rate can be obtained by a simple calculation using the initial value and the parameter, the current control by a microcomputer can be made in a short processing.

Moreover, according to this invention, since the modification of the initial value and that of the parameter are made by use of different values of the response state, the control of the response state can be realized together with the control of the average current.

Moreover, according to this invention, since the calculation of the current flow rate and the output thereof can be independently performed, the current flow rate can be previously calculated without waiting for the output, and the output thereof can be executed by a short processing.

Moreover, according to this invention, since independent current control can be made at each rotational position of the motor for the reason of having the initial values according to the number of current flow modes, the motor drive torque can be changed during one revolution in accordance with the load torque.

Moreover, according to this invention, since the commutation can be synchronized with the reference time of the pulse width modulation signal, or the time at which the pulse is on, irrespective of the rate of revolution, it is possible to obtain a current which agrees with the assumed response irrespective of the rate of revolution.

Moreover, according to this invention, since the pulse width modulation signal can be initialized and produced not through the program of the microcomputer, it is possible to realize the current controller which can produce the pulse width modulation signal synchronized with the commutation without executing complicated processing in the program.

Moreover, according to this invention, since it is possible to control the rise of the winding current which is caused by the 120-degree current flow type inverter, the motor can be controlled in speed to have less variation of drive torque. Also, since the current control can be made by a microcomputer, the current controller can be constructed to be small.

Moreover, according to this invention, since the current control for, independent motor drive torque at each rotational position in accordance with the load torque of the compressor can be made by a microcomputer, low-vibration driving can be realized by a small compressor-drive with a few discrete components.

Furthermore, according to this invention, since the current controller for the current response considering the rise upon commutation can be constructed by a microcomputer, low-vibration driving can be realized by a small blower-drive with a few discrete components.

We claim:

1. A current controller including:

modulating means for which employs a pulse width modulation signal having a first period with which a current change is periodically repeated and in which a plurality of pulses with a second period are included, for modulating a current within said first period by said pulse width modulation signal;

detection means for detecting a current in a load at least once within said second period;

means for producing said pulse width modulation signal in accordance with a current flow rate in order to make said detected current agree with a command value;

assumed response generating means for generating an assumed response as a current response within said first period in accordance with a command current;

load model means for finding said current flow rate in accordance with an initial value stored in a readable and writable memory element in order to flow a current corresponding to said assumed response; and means for modifying the initial value of said load model means in accordance with the difference between said detected current and said assumed response output, and generating the necessary current flow rate at said second period as time elapses after the start of said first period.

2. A current controller comprising:

a pulse width modulation inverter for driving a load;

modulating means for modulating a commutation period by a pulse width modulation signal plurality of pulses within said commutation period in which the direction of current to said load is changed;

detection means for detecting the current a plurality of times within said commutation period; and means for generating the pulse width modulation signal according to a current flow rate in order to make said detected current agree with a command current;

assumed response generating means for generating an assumed response as a current response within said commutation period in accordance with the command current;

model means for finding said current flow rate in accordance with an initial value stored in a readable and writable memory element in order to cause a load current to flow corresponding to said assumed response; and means for modifying said initial value of said model means in accordance with the difference between said detected current and said assumed response and for generating a necessary flow rate at said pulse width modulation period as time elapses after start of the commutation period.

3. A current controller comprising:

a pulse width modulation inverter for driving a load;

modulating means for modulating a commutation period by a pulse width modulation signal having a plurality of pulses within said commutation period in which the direction of current to said load is changed;

detection means for detecting the current a plurality of times within said commutation period; and means for generating the pulse width modulation signal according to a flow rate in order to make said detected current agree with a command current;

assumed response generating means for generating an assumed response as a current response within said commutation period in accordance with the command current;

numerical formula based model means for generating a control output associated with a load current in accordance with said assumed response and an initial value stored in a readable and writable memory element;

modifying means for generating a flow rate as said control output in accordance with the output of said model means which changes as time elapses after the commutation within said commutation period, and for modifying after the end of said commutation period said initial value of said model means in accordance with the difference between a sequence of current detected values detected within said finished commutation period and a sequence of assumed responses at the time when said control output is produced within the finished commutation period.

4. A current controller comprising:

a pulse width modulation inverter for driving a load;

modulating means for modulating a commutation period by a pulse width modulation signal having a plurality of pulses within said commutation period in which the direction of current to said load is changed;

detection means for detecting the current a plurality of times within said commutation period; and means for generating the pulse width modulation signal according to a flow rate in order to make said detected current agree with a command current;

assumed response generating means for generating an assumed response as a current response within said commutation period in accordance with the command current;

model means for finding a current flow rate in accordance with an initial value stored in a readable and writable memory element in order to cause a load current to flow corresponding to said assumed response;

modifying means for modifying said current flow rate in accordance with the difference between said detected current and said assumed response;

modifying means for modifying the initial value of said model means in accordance with the difference between said detected current and said assumed response and for generating a necessary current flow rate as time elapses after commutation in turn; and modifying means for modifying said generated flow rate in accordance with the difference between the just previously detected current value and the assumed response value associated with said detected current.

5. A current controller comprising:

a pulse width modulation inverter for driving a load;

modulating means for modulating a commutation period by a pulse width modulation signal having a plurality of pulses within said commutation period in which the direction of current to said load is changed;

detection means for detecting a current a plurality of times within said commutation period;

means for generating the pulse width modulation signal according to a current flow rate in order to make said detected current agree with a command current;

assumed response generating means for generating an assumed response as a current response within said commutation period in accordance with the command current;

model means for finding a current flow rate in accordance with an initial value stored in a readable and writable memory element in order to cause a load current to flow corresponding to said assumed response and at least one parameter relating to the amount of change of the current flow rate changing within said commutation period; and means for modifying the initial value of said model means in accordance with the difference between said detected current and said assumed response, for modifying said parameter in accordance with the changed pattern within one commutation period of said detected current and the changed pattern within the commutation period of said assumed response, and for sequentially generating a necessary flow rate as time elapses after the commutation.

6. A current controller controlling:

a pulse width modulation inverter for driving a load;

modulating means for modulating a commutation period by a pulse width modulation signal having a plurality of pulses within said commutation period in which the direction of current to said load is changed;

detection means for detecting a current a plurality of times within said commutation period;

means for generating the pulse width modulation signal according to a current flow rate in order to make said detected current agree with a command current;

assumed response generating means for generating an assumed response as a current response within said commutation period in accordance with the command current;

model means for generating a flow rate necessary for causing a load current to flow corresponding to said assumed response by calculating a parameter stored in at least one readable and writable memory element from an initial value stored in a readable and writable memory element;

calculator means for calculating said initial value and said parameter; and means for modifying said initial value in accordance with the integrated value of the difference between said detected current and said assumed response, for modifying the parameter on the basis of the current response state, and for generating a current flow rate in turn by calculating the initial value and said parameter as time elapses after the commutation.

7. A controller including:

calculator means having a first period in which an control output is calculated, and a second period in which a plurality of control output are produced within said first period, and making calculation within said first period to determine a series of value of control output;

output means for producing an amount of control during said second period; and at least one readable and writable memory element for storing a parameter associated with said value of control output; characterized in that said controller further comprises:

two pattern tables each formed of a plurality of readable and writable memory elements; and means for modifying the parameter associated with the value of control output of the n-th period in said first period before at least the (n-2)-th period, calculating, control output produced at said second period in the n-th period, within the (n-1)-th period, storing said control output in one of said two pattern tables, and producing amounts of control associated with the (n-1)-th period from the other pattern table in which said control output are stored, within the (n-2)-th period of said first period at each said second period.

8. A current controller comprising:

a pulse width modulation inverter for driving a load;

modulating means for modulating a commutation period by a pulse width modulation signal having a plurality of pulses within said commutation period in which the direction of current to said load is changed;

detection means for detecting a current a plurality of times within said commutation period;

means for generating the pulse width modulation signal according to a current flow rate in order to make said detected current agree with a command current;

assumed response generating means for generating an assumed response as a current response within said commutation period in accordance with the command current; and model means for finding the current flow rate in accordance with the initial value stored in a readable and writable memory element in order to cause a load current to flow corresponding to said assumed response, characterized in that said model means comprises:

(a) two current flow rate pattern tables each formed of a plurality of readable and writable memory elements and which store the flow rates of the pulse width modulation signal within said commutation in turn; and (b) means having at least two initial values of said model means, and which modifies the initial value of the model means in the n-th commutation period in accordance with the difference between said detected current and said assumed response before at least the (n-2)-th commutation period, stores the output from said model means in accordance with the time lapse after the commutation due to said initial value within the (n-1)-th commutation period, in one of said two flow rate pattern tables, and produces the flow rates associated with the (n-1)-th commutation period from the other flow rate pattern table in which said current flow rates are stored within the (n-2)-th commutation period at each output of said pulse width modulated signal.

9. A current controller comprising:

a pulse width modulation inverter for driving load;

modulating means for modulating a commutation period by a pulse width modulation signal having a plurality of pulses within said commutation period in which the direction of current to said load is changed;

detection means for detecting a current a plurality of times within said commutation period;

means for generating the pulse width modulation signal according to a current flow rate in order to make said detected current agree with a command current;

altering means for altering the on or off time of the pulse width modulation signal in asynchronism with the pulse width modulation signal period; and calculator means for permitting the on or off time of the pulse width modulation signal to agree with said commutation at each commutation at which the previous commutation period ends and the next commutation period starts and for determining the current flow rate in accordance with the difference between said command current and said detected current.

10. A control system comprising:

a pulse width modulation inverter for flowing a current in a load winding;

modulation means for modulating said commutation period by a pulse width modulation signal having a plurality of pulses within the commutation period in which said current is changed in its direction;

means for detecting the current a plurality of times within said commutation period; and means for generating a pulse width modulation output in accordance with a current flow rate in order to cause said detected current to be coincident with a command current; response as a current response within said commutation period in accordance with the command current;

model means for finding a current flow rate in accordance with an initial value stored in a readable and writable memory element in order to cause a winding current to flow corresponding to said assumed response; and current control means for modifying the initial value of said model means in accordance with said detected current and said assumed response, and sequentially generating the necessary flow rate as time elapses after the commutation.

11. A compressor system including:

a motor;

a pulse width modulation inverter for driving said motor;

modulating means for modulating a commutation period by a pulse width modulation signal having a plurality of pulses within said commutation period in which the direction of current to said motor is changed;

detection means for detecting a current a plurality of times within said commutation period; and means for generating the pulse width modulation signal according to a current flow rate in order to make said detected current agree with a command current; characterized in that said compressor system further comprises:

assumed response generating means for motor which generates an assumed response as a current response within said commutation period in accordance with said command current;

motor model means for finding the current flow rate in accordance with the initial value stored in a readable and writable memory element in order to flow a motor current corresponding to said assumed response; and a current controller for modifying the initial value of said motor model means in accordance with the difference between said detected current and said assumed response and sequentially generating the necessary flow rate as time elapses after the commutation.

12. An air blower system including:

a motor;

a pulse width modulation inverter for driving said motor;

modulating means for modulating a commutation period by a pulse width modulation signal having a plurality of pulses within said commutation period in which the direction of current to said motor is changed;

detection means for detecting a current (720) a plurality of times within said commutation period; and means for generating the pulse width modulation signal according to a current flow rate in order to make said detected current agree with a command current; characterized in that said air blower system comprises:

assumed response generating means for motor which generates an assumed response as a current response within said commutation period in accordance with said command current;

motor model means for finding the current flow rate in accordance with the initial value stored in a readable and writable memory element in order to flow a motor current corresponding to said assumed response; and a current controller for modifying the initial value of said motor model means in accordance with the difference between said detected current and said assumed response and sequentially generating the necessary flow rate as time elapses after the commutation.

13. A current controlling apparatus including:

modulation means having a first period in which a load current repeats a rising, for modulating said first period with a pulse-width modulation signal having a second period in which plurality of periods are included within said first period; and means for detecting a load current several times within said first period, characterized by comprising:

first memory means for storing data related to a current detection value previously provided within said first period and a current conduction rate of the pulse-width modulation signal at the time of current detection;

second memory means for storing data related to a constant current rise;

means for presuming a load state from the stored data;

means responsive to the load state presumed by said presuming means for generating a train of pulse-width modulation signals which are outputted within said first period;

means for detecting a difference between the data related to the current detection value previously provided within said first period which is stored by said first memory means and the data related to the current which is stored by said second memory means;

means responsive to the detected difference for modifying the data related to the current conduction rate of said stored previous pulse-width modulation signal; and means for generating a train of pulse-width modulation signals which are outputted within said first period and obtained from said modified data in sychronization with said first period.

14. An air-conditioning apparatus including:

a compressor;

a motor for driving said compressor;

a pulse-width modulation inverter for driving said motor;

modulation means for modulating a commutation period with a pulse-width modulation signal having a plurality of pulses within said commutation period in which a current conduction direction of said motor is changed; and means for detecting a current several times within said commutation period, characterized by comprising:

first memory means for storing data related to a current detection value previously provided within said commutation period and a current conduction rate of the pulse-width modulation signal at the time of current detection;

second memory means for storing data related to a current rise;

means for detecting a difference between the data related to the current detection value previously provided within said commutation period which is stored by said first memory means and the data related to the current which is stored by said second memory means;

means responsive to the detected difference for modifying the data related to the current conduction rate of said stored previous pulse-width modulation signal; and current control means for generating a train of pulse-width modulation signals which are outputted within said commutation period and obtained from said modified data in sychronization with said first period.

15. A fan apparatus including:

a motor;

a pulse-width modulation inverter for driving said motor;

modulation means for modulating a commutation period with a pulse-width modulation signal having a plurality of pulses within said commutation period in which a current conduction direction of said motor is changed; and means for detecting a current several times within said commutation period, characterized by comprising:

first memory means for storing data related to a current detection value previously provided within said commutation period and a current conduction rate of the pulse-width modulation signal at the time of current detection;

second memory means for storing data related to a current rise;

means for detecting a difference between the data related to the current detection value previously provided within said commutation period which is stored by said first memory means and the data related to the current which is stored by said second memory means;

means responsive to the detected difference for modifying the data related to the current conduction rate of said stored previous pulse-width modulation signal; and current control means for generating a train of pulse-width modulation signals which are outputted within said commutation period and obtained from said modified data.

16. An air cleaner including:

a motor;

a pulse-width modulation inverter for driving said motor;

modulation means for modulating a commutation period with a pulse-width modulation signal having a plurality of pulses within said commutation period in which a current conduction direction of said motor is changed; and means for detecting a current several times within said commutation period, characterized by comprising:

first memory means for storing data related to a current detection value previously provided within the commutation period and a current conduction rate of the pulse-width modulation signal at the time of current detection;

second memory means for storing data related to a current rise;

means for detecting a difference between the data related to the current detection value previously provided within said commutation period which is stored by said first memory means and the data related to the current which is stored by said second memory means;

means responsive to the detected difference for modifying the data related to the current conduction rate of said stored previous pulse-width modulation signal; and current control means for generating a train of pulse-width modulation signals which are outputted within said commutation period and obtained from said modified data.

17. A current controller for controlling a current flowing through a load, comprising:

modulating means responsive to a pulse width modulation signal having a first period at which a current change is periodically repeated and in which a plurality of pulses with a second period are included, for modulating said current flowing through said load within said first period;

detection means for detecting said current flowing through said load at least once within said second period;

means for producing said pulse width modulation signal having a duty factor which varies in each second period in accordance with a current flow rate signal in order to force said detected current to follow a predetermined current characteristic within each first period; and load model means for generating said current flow rate signal in accordance with a time function based on an initial value, including means for modifying the initial value in accordance with a difference between said detected current and said predetermined current characteristic, thereby generating a current flow rate signal beginning at said initial value and varying in accordance with said time function for each second period as time elapses after the start of said first period.

18. A current controller according to claim 2, wherein said load is a motor.

19. A current controller according to claim 2, wherein said load is a motor connected to a compressor.

20. A current controller according to claim 2, wherein said load is a motor connected to a fan.

21. A current control method comprising the steps of:

employing a pulse width modulation signal having a first period in which a current change is periodically repeated, a second period periodically repeated within the first period, and a plurality of pulses periodically repeating at the second period, for modulating a current flow within the first period with the pulse modulating signal;

detecting a current flowing in a load at least one time within the second period;

producing the pulse width modulation signal in accordance with a current flow rate of the pulse width modulation to make the detected current coincide with a command value;

generating a current reference command as an optimum current command waveform rising with a primary delay from zero to a predetermined current command value within the first period;

calculating the current flow rate of the pulse width modulation within the first period in accordance with an initial current flow rate in the first period stored in a readable and writable memory element in order to make a current coincide with the current reference command; and modifying the initial current flow rate in accordance with a difference between the detected current and the current reference command, and generating a necessary current flow rate of the pulse width modulation at the second period in accordance with a lapse of time after the first period.

22. A calculator unit comprising:

a calculator element;

a counting element which increments or decrements in accordance with a change of an input signal;

a readable and writable memory element for storing a numerical value;

determining means for determining either one of two output states in accordance with a comparison between contents of said counting element and said memory element;

a signal control element for generating an initializing signal in accordance with a change of an external signal or a signal from the calculator element; and means for resetting the contents of said counting element to an arbitrary value in response to said initializing signal;

wherein said determining means turns a pulse width modulation signal either on or off in accordance with the either one of the two output states determined in accordance with the comparison between the contents of said counting element and said memory element.

23. A current controller including:

modulating means for which employs a pulse width modulation signal having a first period with which a current change is periodically repeated and in which a plurality of pulses with a second period are included, for modulating a current within said first period by said pulse width modulation signal;

detection means for detecting a current in a load at least once within said second period;

means for producing said pulse width modulation signal in accordance with a current flow rate in order to make said detected current agree with a command value;

assumed response generating means for generating an assumed response as a current response within said first period in accordance with a command current;

load model means for finding said current flow rate in accordance with an initial value stored in a readable and writable memory element in order to flow a current corresponding to said assumed response; and means for modifying the initial value of said load model means in accordance with the difference between said detected current and said assumed response output, and generating the necessary current flow rate at said second period as time elapses after the start of said first period;

wherein said means for producing said pulse width modulation signal includes a calculator unit, said calculator unit including:

a calculator element;

a counting element which increments or decrements in accordance with a change of an input signal;

a readable and writable memory element for storing a numerical value;

determining means for determining either one of two output states in accordance with a comparison between contents of said counting element and said memory element;

a signal control element for generating an initializing signal in accordance with a change of an external signal or a signal from the calculator element; and means for resetting the contents of said counting element to an arbitrary value in response to said initializing signal.

24. A current controlling apparatus comprising:

modulation means for modulating a load current which rises during a predetermined period with a pulse-width modulation signal having a plurality of pulses within said predetermined period, the predetermined period occurring repeatedly;

means for detecting the load current at least twice within said predetermined period;

means for storing data related to a previous load current detected within a previous occurrence of the predetermined period and a current conduction rate of the pulse-width modulation signal at a time the previous load current was detected;

means for presuming a load state from the stored data; and means responsive to the load state presumed by said presuming means for generating the pulse-width modulation signal having a plurality of pulses, pulse widths of all of the pulses being defined at one time, and for supplying the generated pulse-width modulation signal to the modulation means;

wherein said means responsive to the load state presumed by said presuming means for generating the pulse-width modulation signal includes a calculator unit, said calculator unit including:

a calculator element;

a counting element which increments or decrements in accordance with a change of an input signal;

a readable and writable memory element for storing a numerical value;

determining means for determining either one of two output states in accordance with a comparison between contents of said counting element and said memory element;

a signal control element for generating an initializing signal in accordance with a change of an external signal or a signal from the calculator element; and means for resetting the contents of said counting element to an arbitrary value in response to said initializing signal.

25. A current controller for controlling a current flowing through a load, comprising:

modulating means responsive to a pulse width modulation signal having a first period at which a current change is periodically repeated and in which a plurality of pulses each having a second period are included, for modulating said current flowing through said load within said first period;

detection means for detecting said current flowing through said load at least once within said second period of each of said pulses; and means for producing said pulse width modulation signal including a plurality of pulses such that duty factors of all of the pulses are defined at one time in accordance with a current detected by said detection means and a current flow rate signal in order to force said current flowing through said load to follow a predetermined current characteristic within said first period;

wherein said means for producing said pulse width modulation signal includes a calculator unit, said calculator unit including:

a calculator element;

a counting element which increments or decrements in accordance with a change of an input signal;

a readable and writable memory element for storing a numerical value;

determining means for determining either one of two output states in accordance with a comparison between contents of said counting element and said memory element;

a signal control element for generating an initializing signal in accordance with a change of an external signal or a signal from the calculator element; and means for resetting the contents of said counting element to an arbitrary value in response to said initializing signal.

* * * * *